United States Patent
Priya et al.

(10) Patent No.: US 11,576,115 B2
(45) Date of Patent: Feb. 7, 2023

(54) SYSTEMS AND METHODS FOR DESIGNING NETWORK SLICES USING EXTENSIBLE COMPONENTS

(71) Applicant: Verizon Patent and Licensing Inc., Basking Ridge, NJ (US)

(72) Inventors: Viswanath Kumar Skand Priya, Irving, TX (US); Kristen Sydney Young, Morris Plains, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 172 days.

(21) Appl. No.: 17/088,362

(22) Filed: Nov. 3, 2020

(65) Prior Publication Data

US 2022/0141760 A1   May 5, 2022

(51) Int. Cl.
*H04W 48/18*   (2009.01)
*H04W 84/18*   (2009.01)
*H04W 24/10*   (2009.01)
*H04W 24/02*   (2009.01)

(52) U.S. Cl.
CPC .......... *H04W 48/18* (2013.01); *H04W 24/02* (2013.01); *H04W 24/10* (2013.01); *H04W 84/18* (2013.01)

(58) Field of Classification Search
CPC ..... H04W 48/18; H04W 24/02; H04W 24/10; H04W 84/18
See application file for complete search history.

(56) References Cited

U.S. PATENT DOCUMENTS

| | | | |
|---|---|---|---|
| 11,146,453 B2 * | 10/2021 | Li | H04L 41/40 |
| 2020/0229080 A1 * | 7/2020 | Xu | H04L 41/40 |
| 2022/0141760 A1 * | 5/2022 | Priya | H04W 48/18 370/329 |

FOREIGN PATENT DOCUMENTS

| | | | | |
|---|---|---|---|---|
| WO | WO-2018213991 A1 * | 11/2018 | ......... | G06F 9/45558 |
| WO | WO-2019062830 A1 * | 4/2019 | ......... | H04L 41/0843 |

* cited by examiner

*Primary Examiner* — Julio R Perez

(57) ABSTRACT

A system may include one or more devices that with processors. The processors are configured to: receive instructions to assemble a slice service design for a network using slice design components; store the slice service design; and receive a request to deploy a slice service specified by the slice service design. The processors may be configured to: deploy the slice service in subnets of the network; or deploy services defined by portions of the slice service design in some of the subnets of the network.

20 Claims, 30 Drawing Sheets

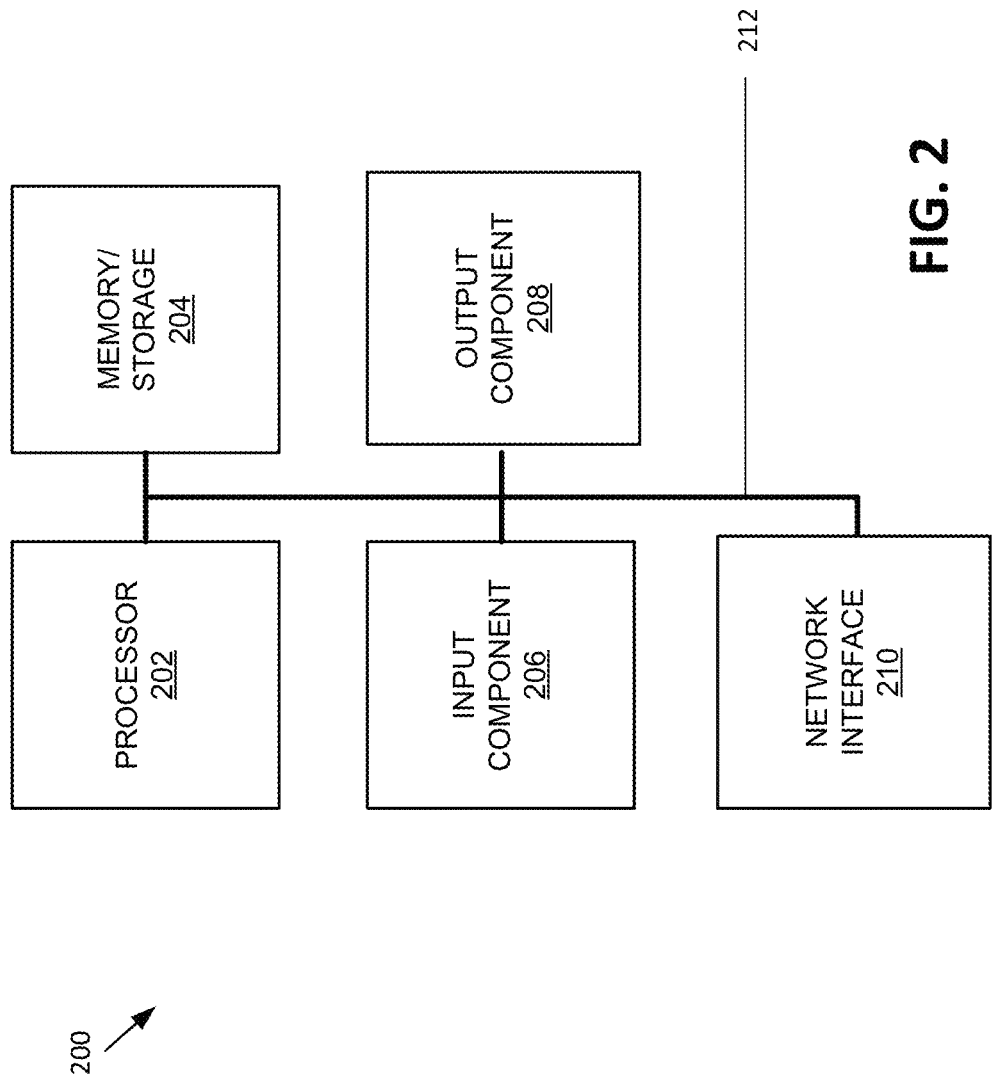

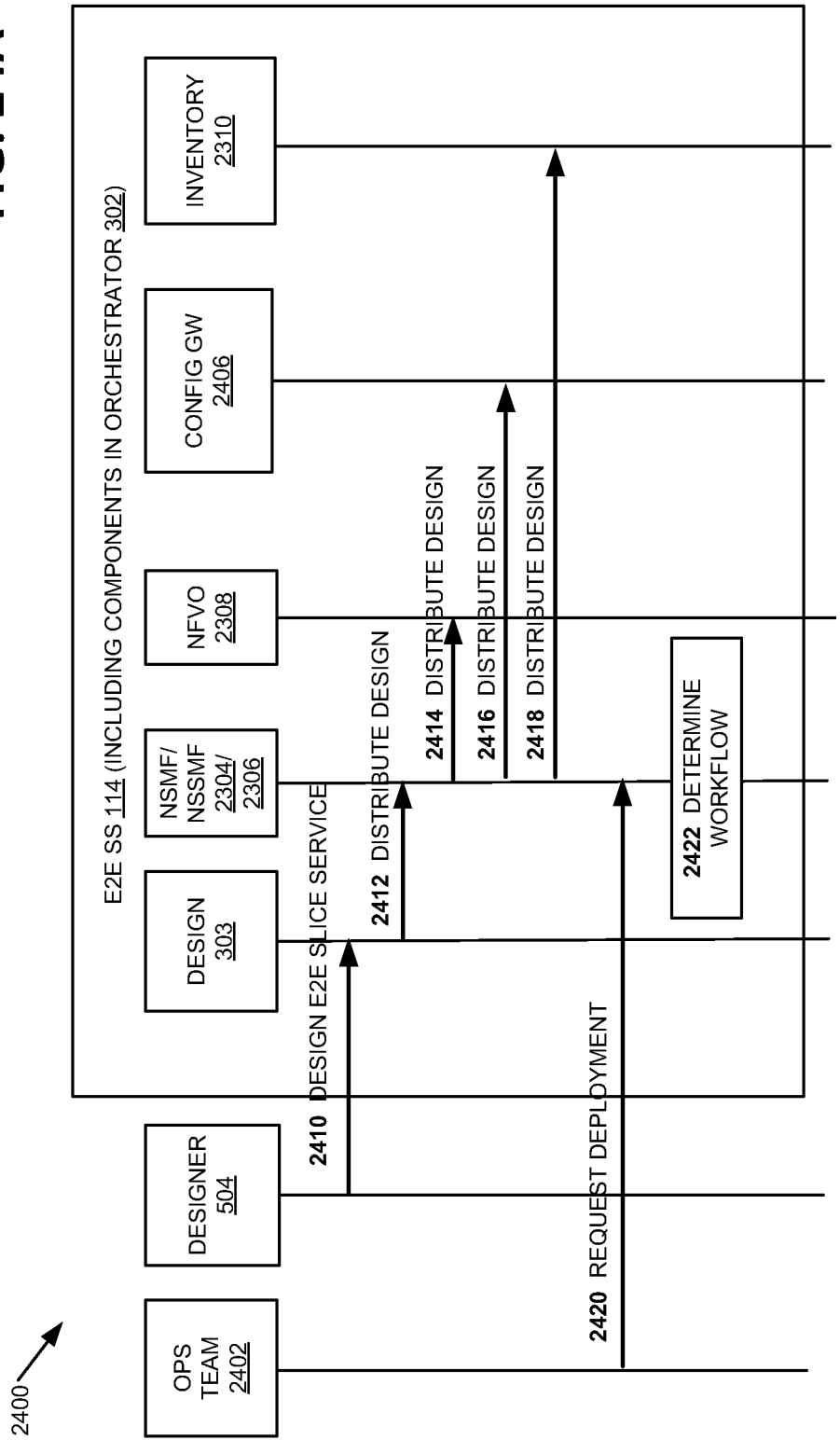

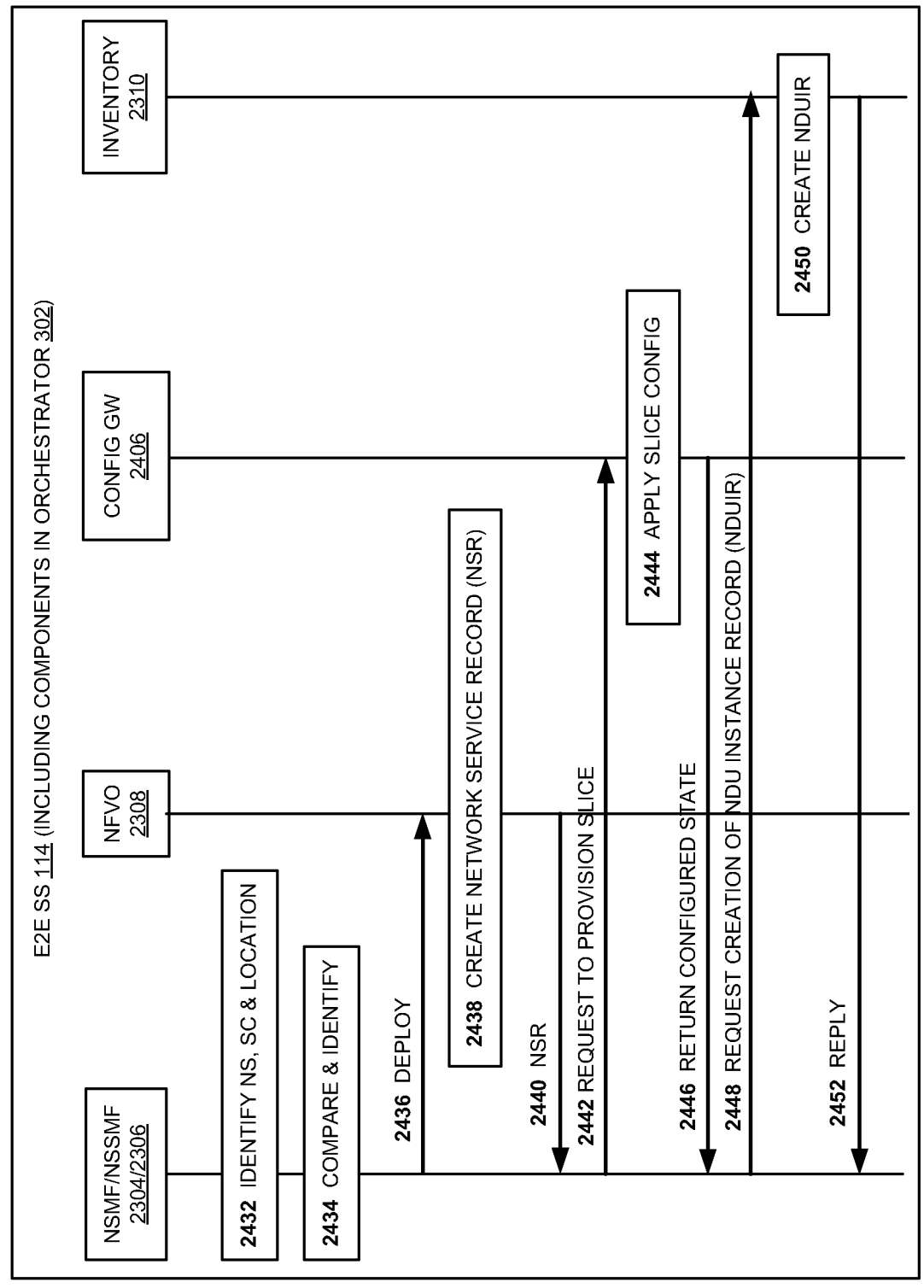

SYSTEMS AND METHODS FOR DESIGNING NETWORK SLICES USING EXTENSIBLE COMPONENTS

BACKGROUND INFORMATION

Advanced wireless networks, such as Fifth Generation (5G) networks, have the ability to perform network slicing to increase network efficiency and performance. Network slicing involves a form of virtual network architecture that enables multiple logical networks to be implemented on top of a shared physical network infrastructure using software defined networking (SDN) and/or network function virtualization (NFV). Each logical network, referred to as a "network slice," may encompass an end-to-end virtual network with dedicated storage and/or computational resources that include access networks, clouds, transport, Central Processing Unit (CPU) cycles, memory, etc. Furthermore, each network slice may be configured to meet a different set of requirements and be associated with a particular Quality of Service (QoS) class, type of service, and/or particular enterprise customers associated with mobile communication devices.

BRIEF DESCRIPTION OF THE DRAWINGS

FIG. 2 depicts exemplary components of an exemplary network device of the networks of FIGS. 1A-1C;

FIGS. 24A-24C show a signaling diagram that is associated with an exemplary slice deployment process according to another implementation.

DETAILED DESCRIPTION OF PREFERRED EMBODIMENTS

The following detailed description refers to the accompanying drawings. The same reference numbers in different drawings may identify the same or similar elements.

Current known network orchestration systems and frameworks do not implement the concept of a comprehensive design system that incorporates service-driven slice infrastructure designs that include a per slice instance configuration. When using a typical orchestration framework for 5G slice design, there is no way to define and deploy all parts of network slices.

The systems and methods described herein relate to network slice planning, including details about site specific deployment plans, per slice configurations and per slice assurance services. A network designer may use the system to design reusable and extensible components. The components may include, for example, a Network Service Configuration component, an Application Configuration (APC) component; a Network Function Configuration (NFC) component; a Slice Configuration (SC) component; an Infrastructure Deployment Unit (IDU); a Network Slice Deployment Unit (NDU); alternate deployment unit sets (NDU sets); an Assurance Deployment Unit (ADU); an Assurance Module (AM); an Assurance Module Configuration (AMC) component; a Service Assurance Policy (SAP) component; a Slice Metadata (SMD) component; an Assurance microservice (AµS) component; a Slice Profile (SLP); a Service Profile (SP); a Location Component (LOC); a Network Service (NS); a Network Function (NF); etc. These components may be used to design modular slice and service assurance service deployment plans. The system allows individual operations teams to have a full control in managing the deployment of network functions. Furthermore, systems described herein promote reusability of design components, which leads to intuitive slice design experience for network planning.

The system and methods described herein also relate to processing deployment specific information aggregated and stored as profiles (also referred to as descriptors) in design catalogs. A network designer or operator may define a slice and/or Slice Assurance Service (SAS) to generate one or more of the descriptors. When desired, the network may request an End-to-End Slice Service (E2E SS) deployment system to instantiate the slice and/or the SAS defined by the descriptors without further intervention on the part of a designer or operator. The system may enable on-demand service offerings and automated network adaptation (e.g., network repair).

Figure 1A:
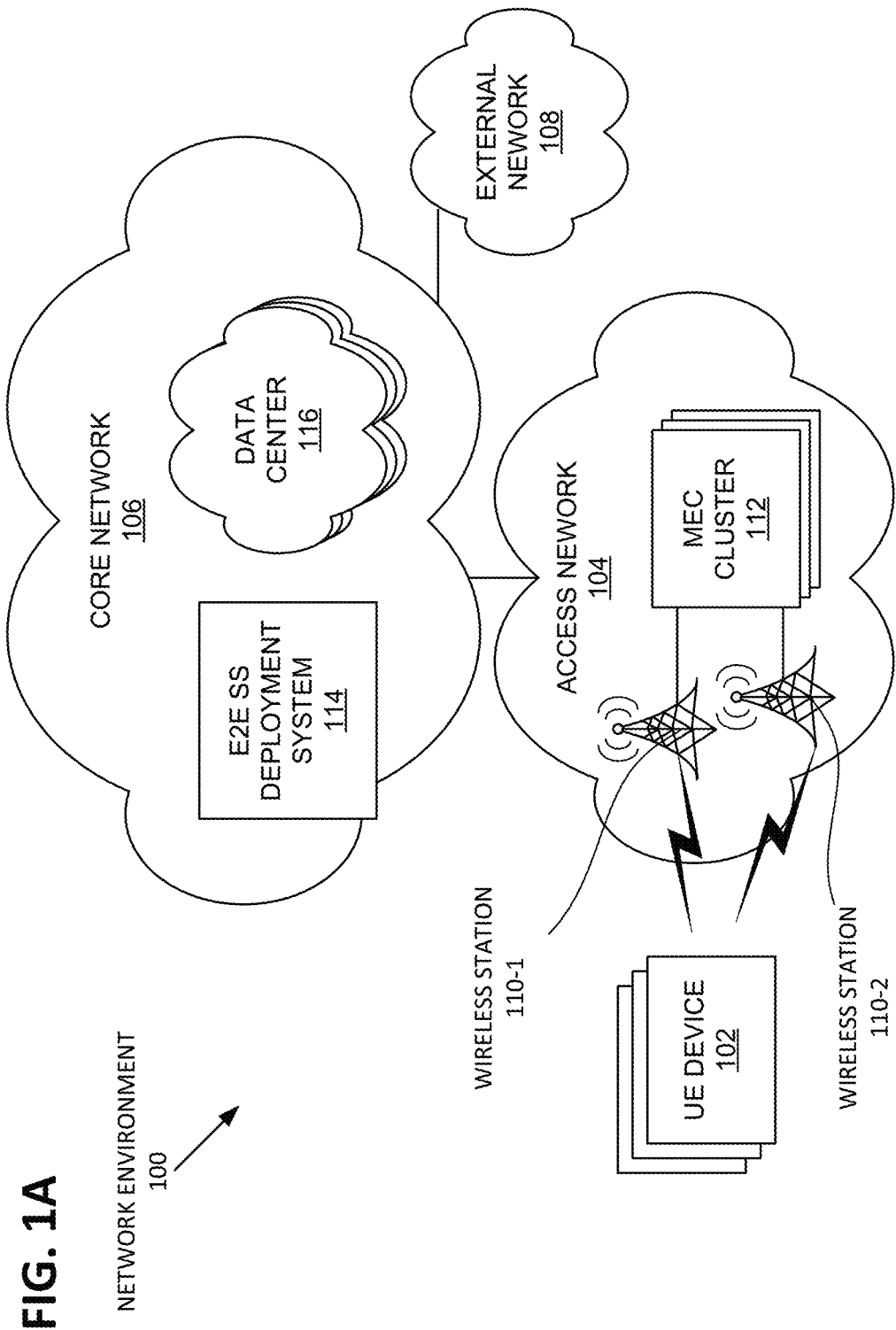
FIG. 1A illustrates an exemplary network environment in which systems and methods described herein may be implemented.
Figure 1B:
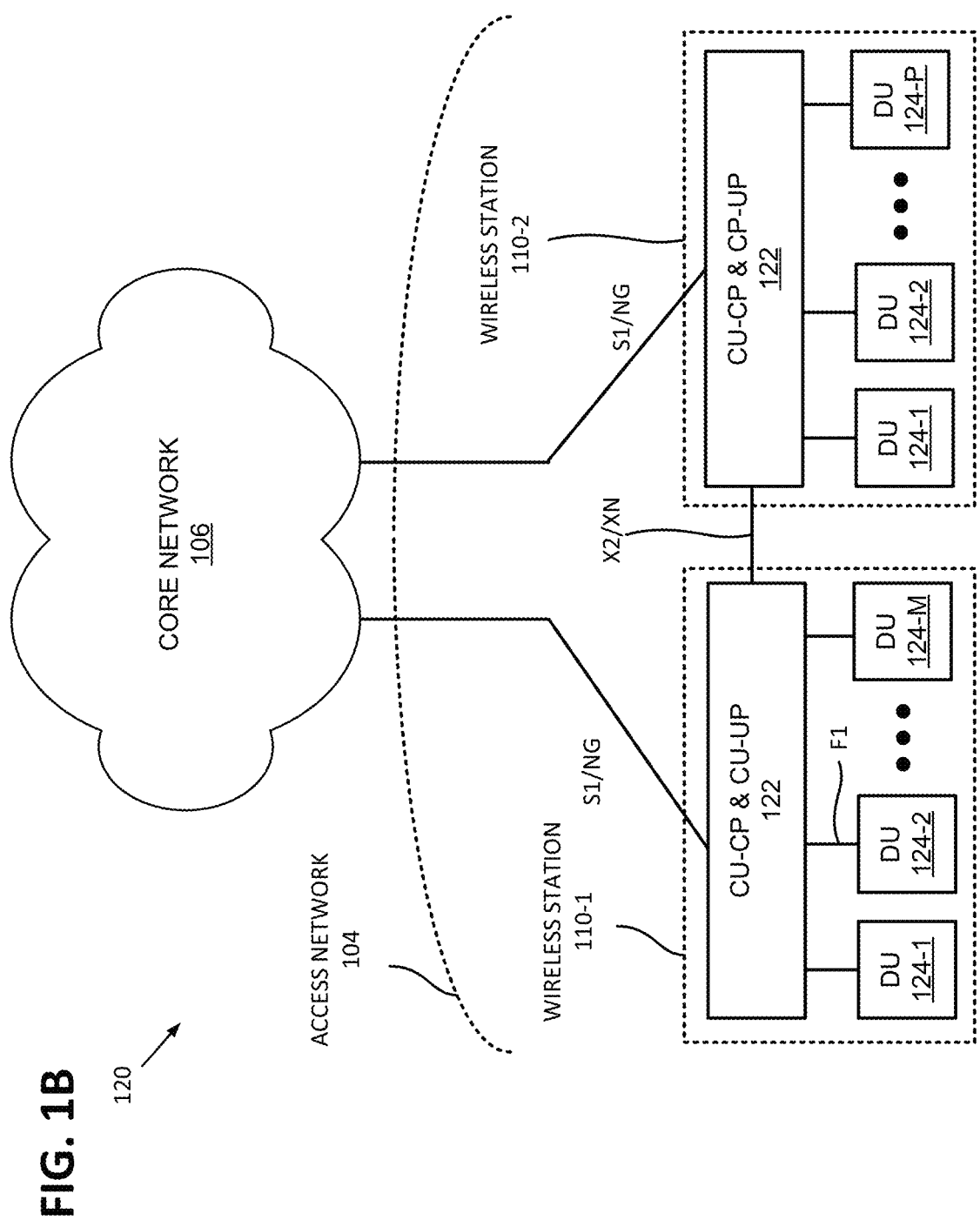
FIG. 1B shows exemplary functional components, in the access network of FIG. 1A, that the End-to-End (E2E) Slice Service (SS) deployment system of FIG. 1A may deploy.
Figure 1C:
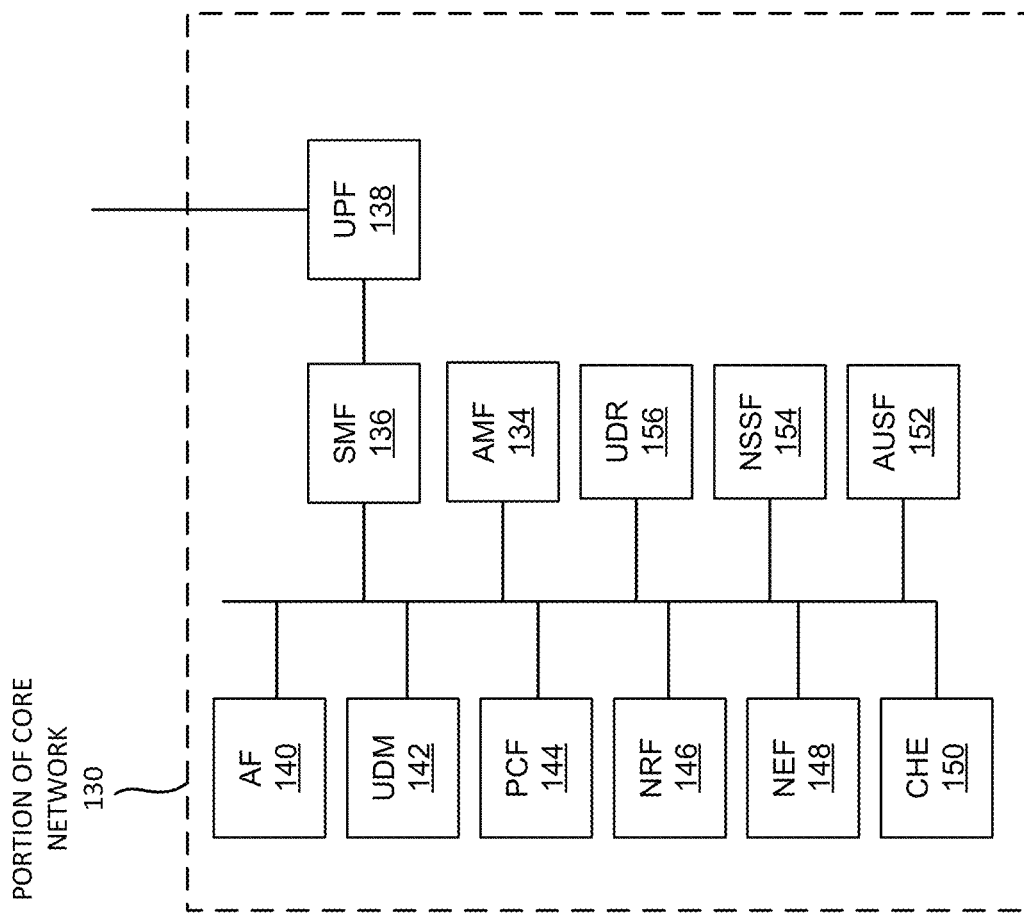
FIG. 1C illustrates exemplary functional components, in the core network of FIG. 1A, that the E2E SS deployment system of FIG. 1A may deploy.

FIG. 1A illustrates an exemplary network environment 100 in which the systems and methods described herein may be implemented. FIGS. 1B and 1C show functional components of portions of network environment 100 in greater detail. Referring to FIG. 1A, environment 100 may include one or more of User Equipment (UE) device 102, access network 104, core network 106, and external network 108.

UE device 102 may include a wireless communication device. Examples of UE device 102 include: a smart phone; a tablet device; a wearable computer device (e.g., a smart watch); a laptop computer; a portable gaming system; and an Internet-of-Thing (IoT) device. In some implementations, UE device 102 may correspond to a wireless Machine-Type-Communication (MTC) device that communicates with other devices over a machine-to-machine (M2M) interface, such as Long-Term-Evolution for Machines (LTE-M) or Category M1 (CAT-M1) devices and Narrow Band (NB)-IoT devices. UE device 102 may send packets over or to access network 104.

Access network 104 may allow UE device 102 to access core network 106. To do so, access network 104 may establish and maintain, with participation from UE device 102, an over-the-air channel with UE device 102; and maintain backhaul channels with core network 106. Access network 104 may convey information through these channels, from UE device 102 to core network 106 and vice versa.

Access network 104 may include a Fourth Generation (4G) radio network, a Fifth Generation (5G) radio network, and/or another advanced radio network. These radio networks may include many wireless stations, which are illustrated in FIG. 1A as wireless stations 110-1 and 110-2 (generically referred to as wireless station 110 and collectively as wireless stations 110) for establishing and maintaining an over-the-air channel with UE device 102.

Wireless station 110 may include a 5G, 4G, or another type of wireless station (e.g., evolved Node B (eNB), next generation Node B (gNB), etc.) that includes one or more Radio Frequency (RF) transceivers. Wireless station 110 (also referred to as base station 110) may provide or support one or more of the following: 4 Tx functions (e.g., 4 transceiver antenna function); carrier aggregation functions; advanced or massive multiple-input and multiple-output (MIMO) antenna functions (e.g., 8×8 antenna functions, 16×16 antenna functions, 256×256 antenna functions, etc.); cooperative MIMO (CO-MIMO) functions; relay stations; Heterogeneous Network (HetNets) of overlapping small cell-related functions; macrocell-related functions; Machine-Type Communications (MTC)-related functions, such as 1.4 MHz wide enhanced MTC (eMTC) channel-related functions (i.e., Cat-M1), Low Power Wide Area (LPWA)-related functions such as Narrow Band (NB) Internet-of-Thing (IoT) (NB-IoT) technology-related functions, and/or other types of MTC technology-related functions; Dual connectivity (DC), and other types of LTE-Advanced (LTE-A) and/or 5G-related functions. In some implementations, wireless station 110 may be part of an evolved UMTS Terrestrial Network (eUTRAN). Wireless station 110 may include Remote Electronic Tilt (RET) capability for beam steering or beam shaping.

As further shown, wireless stations 110 may be coupled to MEC clusters 112 in access network 104. MEC clusters 112 may be located geographically close to wireless stations 110, and therefore also be close to UE devices 102 serviced by access network 104 via wireless station 110. Due to its proximity to UE device 102, MEC cluster 112 may be capable of providing services to UE devices 102 with minimal latency. Depending on the implementations, MEC clusters 112 may provide many core network functions and/or application functions at network edges.

Core network 106 may include a local area network (LAN), a wide area network (WAN), a metropolitan area network (MAN), an optical network, a cable television network, a satellite network, a wireless network (e.g., a Code Division Multiple Access (CDMA) network, a general packet radio service (GPRS) network, an LTE network (e.g., a 4G network), a 5G network, an ad hoc network, a telephone network (e.g., the Public Switched Telephone Network (PSTN), an intranet, or a combination of networks. Core network 106 may allow the delivery of communication services (e.g., Internet Protocol (IP) services) to UE device 102, and may interface with other networks, such as external network 108. Depending on the implementation, core network 106 may include 4G core network components (e.g., a Serving Gateway (SGW), a Packet data network Gateway (PGW), a Mobility Management Entity (MME), etc.), 5G core network components, or another type of core network component.

As further shown, core network 106 may include an End-to-End Slice Service (E2E SS) deployment system 114 (also referred to as "system 114") and data centers 116. E2E SS deployment system 114 may allow network operators to design and deploy network slices and slice assurance services, which are further described below. For designing a network slice or an SAS, system 114 may receive specific information from the network operators through its user interface, aggregate and store the inputs as profiles (also referred to as descriptors) in design catalogs. That is, slice descriptors define network slices and/or SASs. When needed, the network operator may request E2E SS deployment system 114 to instantiate the slice/SAS defined by the slice descriptor, without further design intervention.

Data centers 116 may include computer devices (e.g., servers). Although shown as part of core network 106, data centers 116 may also be implemented within external network 108 or MEC clusters 112. The devices of data centers 116 may be arranged as part of network function virtualization infrastructure (NFVI) and/or a cloud computing platform.

External network 108 may include networks that are external to core network 106. In some implementations, external network 108 may include packet data networks, such as an IP network. An IP network may include, for example, an IP Multimedia Subsystem (IMS) network that may provide a Short Messaging Service (SMS), Voice-over-IP (VoIP) service, etc.

In the implementation shown in FIG. 1A, deployment of a network slice and/or a slice assurance service by E2E SS deployment system 114 may entail instantiation of network functions and/or sharing use of software and hardware components in access network 104 and core network 106. More specifically, in exemplary embodiments, E2E SS deployment system 114 may receive, from a network operator, input specifications for design and deployment of these network components and generate slice descriptors/profiles based on the input. Upon demand from the network operator, E2E SS deployment system 114 may apply the slice descriptors to instantiate the network components and/or share the use of the hardware/software components in access network 104 and core network 106. That is, E2E SS deployment system 114 has the ability to implement, as part of a network slice and/or SAS, some of the components of access network 104 and core network 106. Some of these network functions and hardware/software components that may be instantiated or used (as part of the deployed network slice and/or the SAS) by E2E SS deployment system 114 are illustrated as network components in FIGS. 1B and 1C.

FIG. 1B illustrates exemplary functional components, of access network 104 of FIG. 1A. E2E SS deployment system 114 may deploy (i.e., instantiate and/or share) as part of a network slice or an SAS, virtual versions of these components based on service descriptors. Consistent with FIG. 1A, access network 104 includes wireless stations 110-1 and 110-2—other wireless stations that may be part of access network 104 are not shown in FIG. 1A or 1B. Each wireless station 110 includes a central unit-control plane (CU-CP) and central unit user plane (CU-UP) 122, distributed units (DUs) 124-1 through 124-M/P, and one or more Radio Units (RUs). For simplicity, RUs are not shown in FIG. 1B.

CU-CP and CU-UP 122 (collectively CU 122) may process control plane and user plane upper layers of the communication protocol stack for wireless stations 110. For example, assume that wireless station 110-1 is a gNB. Communications at the gNB user plane include, from the lowest layer to the highest layer: a physical (PHY) layer, a Media Access Control layer (MAC) layer, a Radio Link Control (RLC) layer, and a Packet Data Convergence Protocol (PDCP) layer. The control plane communications include the same layers as those in the user plane, and in addition, includes a Radio Resource Control (RRC) layer. CU 122 may not be located physically close to DUs 124, and may be implemented as cloud computing elements, through network function virtualization (NFV) capabilities of the cloud. As shown, CU 122 communicates with the components of core network 106 through S 1/NG interface and with other CUs 122 through X2/XN interface.

DUs 124 may process lower layers of the communication protocol stack and may provide support for one or more cells with multiple radio beams. In addition, DUs 124 may handle UE device mobility, from DU to DU, gNB to gNB, cell to cell, beam to beam, etc. DUs 124 may communicate with a CU 122 through F1 interface.

FIG. 1C illustrates exemplary functional components of core network 106 of FIG. 1A. E2E SS deployment system 114 may deploy (i.e., instantiate and/or share) virtual versions of these components based on service descriptors. In FIG. 1C, a portion 130 of core network 106 is shown as a 5G core network, although other types of core network components are possible. Portion 130 comprises a number of network function (NFs), which include: an Access and Mobility Function (AMF) 134 to perform registration management, connection management, reachability management, mobility management, and/or lawful intercepts; an Session Management Function (SMF) 136 to perform session management, session modification, session release, IP address allocation and management, Dynamic Host Configuration Protocol (DHCP) functions, and selection and control of a User Plane Function (UPF) 138; and a UPF 138 to serve as a gateway to packet data network, act as an anchor point, perform packet inspection, routing, and forwarding, perform QoS handling in the user plane, uplink traffic verification, transport level packet marking, downlink packet buffering, and/or other type of user plane functions.

Portion 130 further includes: an Application Function (AF) 140 to provide services associated with a particular application; a Unified Data Management (UDM) 142 to manage subscription information, handle user identification and authentication, and perform access authorization; a Policy Control Function (PCF) 144 to support policies to control network behavior, provide policy rules to control plane functions, access subscription information relevant to policy decisions, and perform policy decisions; a Network Repository Function (NRF) 146 to support service discovery, registration of network function instances, and maintain profiles of available network function instances; a Network Exposure Function (NEF) 148 to expose capabilities and events to other network functions, including third party network functions; a Charging Function (CHF) 150 to perform charging and billing functions; an Authentication Server Function (AUSF) 152 to render authentication services and other security related services to other network components; a Network Slice Selection Function (NSSF) 154 to select a network slice instance to serve a particular UE device 102; a Unified Data Repository (UDR) 156 to provide a repository for subscriber information and other types of information; and/or other types of network functions.

For simplicity, FIGS. 1A-1C do not show all components that may be included in network environment 100, access network 104, core network 106, and external network 108 (e.g., routers, bridges, wireless access point, additional networks, additional UE devices, etc.). That is, depending on the implementation, network environment 100, access network 104, core network 106, and external network 108 may include additional, fewer, different, or a different arrangement of components than those illustrated in FIGS. 1A-1C.

FIG. 2 depicts exemplary components of an exemplary network device 200. One or more of network device 200 correspond to, are included in, or provide a hardware platform for implementation of any of the network components of FIG. 1A-1C (e.g., a router, a network switch, servers, gateways, wireless stations 110, UE device 102, etc.). As shown, network device 200 includes a processor 202, memory/storage 204, input component 206, output component 208, network interface 210, and communication path 212. In different implementations, network device 200 may include additional, fewer, different, or a different arrangement of components than the ones illustrated in FIG. 2. For example, network device 200 may include a display, network card, etc.

Processor 202 may include a processor, a microprocessor, an Application Specific Integrated Circuit (ASIC), a Field Programmable Gate Array (FPGA), a programmable logic device, a chipset, an application specific instruction-set processor (ASIP), a system-on-chip (SoC), a central processing unit (CPU) (e.g., one or multiple cores), a microcontrollers, and/or another processing logic device (e.g., embedded device) capable of controlling device 200 and/or executing programs/instructions.

Memory/storage 204 may include static memory, such as read only memory (ROM), and/or dynamic memory, such as random-access memory (RAM), or onboard cache, for storing data and machine-readable instructions (e.g., programs, scripts, etc.).

Memory/storage 204 may also include a floppy disk, CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 204 may be external to and/or removable from network device 200. Memory/storage 204 may include, for example, a Universal Serial Bus (USB) memory stick, a dongle, a hard disk, off-line storage, a Blu-Ray® disk (BD), etc. Memory/storage 204 may also include devices that can function both as a RAM-like component or persistent storage, such as Intel® Optane memories.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 206 and output component 208 may provide input and output from/to a user to/from device 200. Input and output components 206 and 208 may include, for example, a display screen, a keyboard, a mouse, a speaker, actuators, sensors, gyroscope, accelerometer, a microphone, a camera, a DVD reader, Universal Serial Bus (USB) lines, and/or other types of components for obtaining, from physical events or phenomena, to and/or from signals that pertain to device 200.

Network interface 210 may include a transceiver (e.g., a transmitter and a receiver) for network device 200 to communicate with other devices and/or systems. For example, via network interface 210, network device 200 may communicate with wireless station 110.

Network interface 210 may include an Ethernet interface to a LAN, and/or an interface/connection for connecting device 200 to other devices (e.g., a Bluetooth interface). For example, network interface 210 may include a wireless modem for modulation and demodulation.

Communication path 212 may enable components of network device 200 to communicate with one another.

Network device 200 may perform the operations described herein in response to processor 202 executing software instructions stored in a non-transient computer-readable medium, such as memory/storage 204. The software instructions may be read into memory/storage 204 from another computer-readable medium or from another device via network interface 210. The software instructions stored in memory or storage (e.g., memory/storage 204, when executed by processor 202, may cause processor 202 to perform processes that are described herein.

Figure 3A:
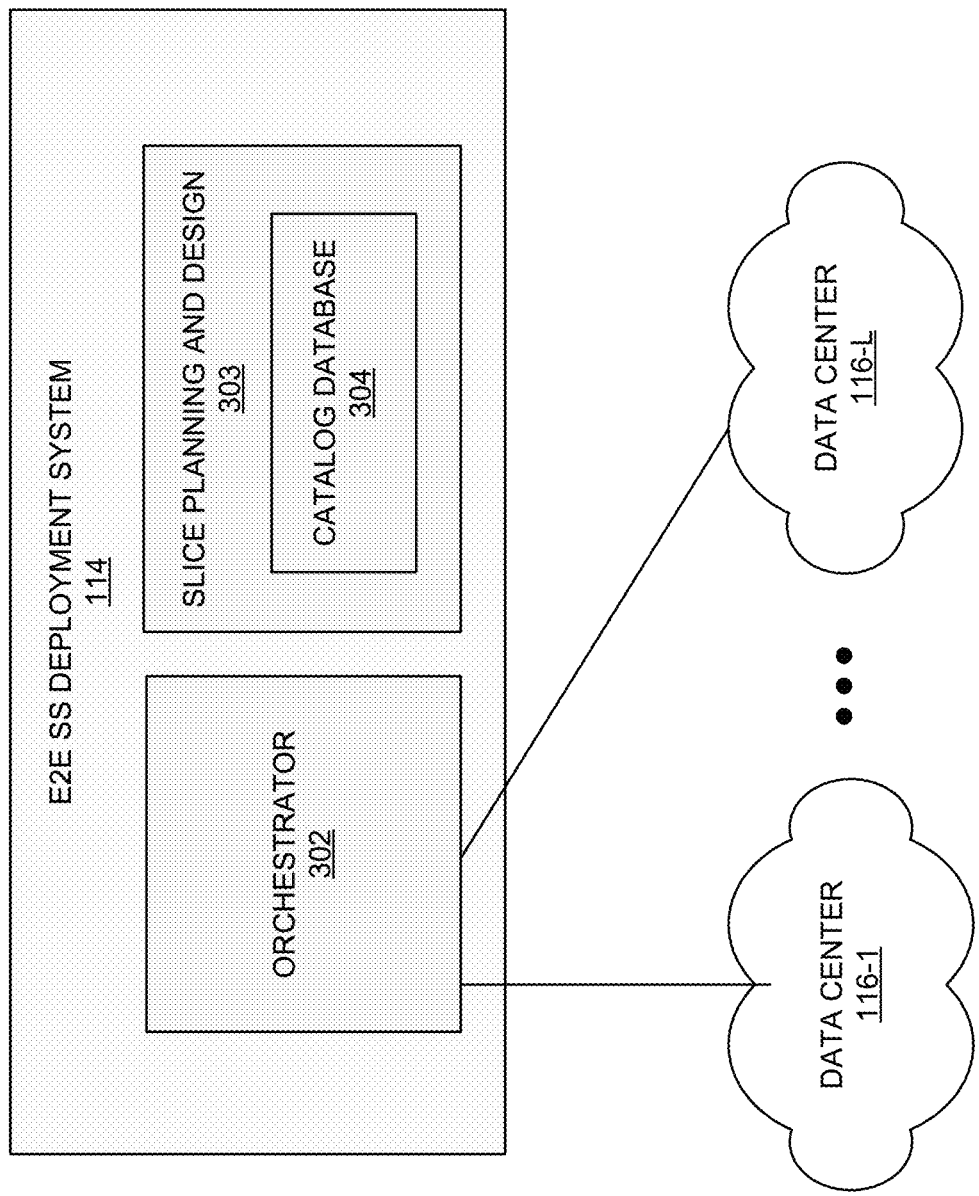
FIG. 3A illustrates exemplary logical components of the E2E SS deployment system of FIG. 1A according to one implementation.

FIG. 3A illustrates exemplary logical components of E2E SS deployment system 114 of FIG. 1A according to one implementation. As shown, E2E SS deployment system 114 includes an orchestrator 302 and a Slice Planning and Design system 303 (also referred to as Design system 303), which in turn includes a design catalog database 304. Design system 303 may include software components for network operators to create, edit, delete, and store network slice and/or SAS designs. When design system 303 creates, edits, or deletes a slice and/or SAS design, system 303 receives network operator input related to service descriptors that define a network slice and/or SAS. Design system 303 organizes profiles that it has created as design catalogs and stores them in design catalog database 304. When a network operator requests E2E SS deployment system 114 to implement a service/slice and/or SAS, orchestrator 302 retrieves the descriptor, parses the descriptor, and implements the service/slice and/or SAS in one or more of data centers 116-1 through 116-L. Orchestrator 302 may also recruit network components not necessarily in data centers 116 but in access network 104, such as those described above in relation to FIG. 1B. These components are not illustrated in FIG. 3A.

Figure 3B:
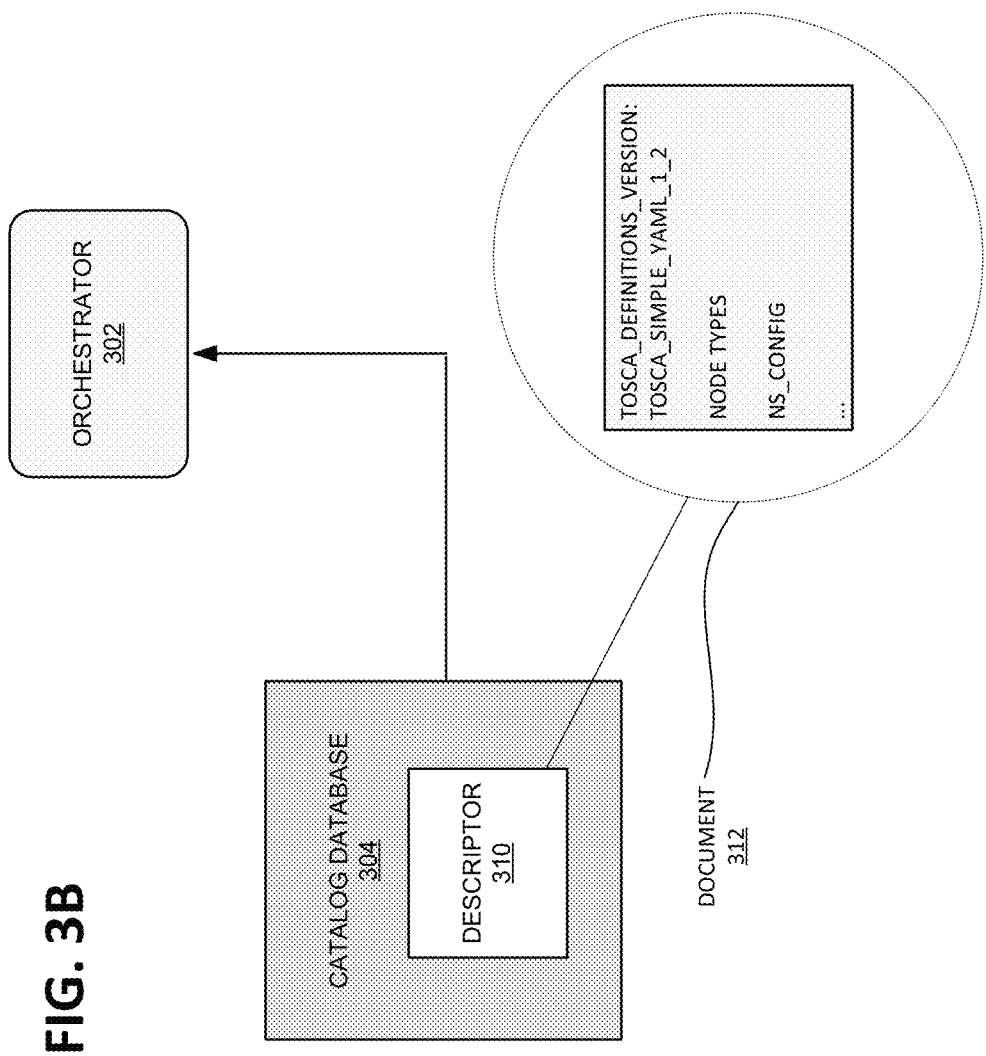
FIG. 3B illustrates exemplary processing, by the orchestrator of FIG. 3A, descriptors that are stored in the catalog database of FIG. 3A.

FIG. 3B illustrates exemplary processing, by orchestrator of FIG. 3A, of descriptors that are stored in catalog database 304 of FIG. 3A. As shown, descriptor 310 is an electronic document (e.g., a file) 312, and is parsed by orchestrator 302. Orchestrator 302 instantiates and deploys network slice components and SAS components described by descriptor 310/document 312 in data centers 116. In some implementations, document 312 may be written in a YAML Ain't Markup Language (YAML). In FIG. 3B, descriptor 310/document 312 is shown as written in the Topology and Orchestration Specification for Cloud Applications (TOSCA) language, which is a dialect of YAML.

Figure 4:
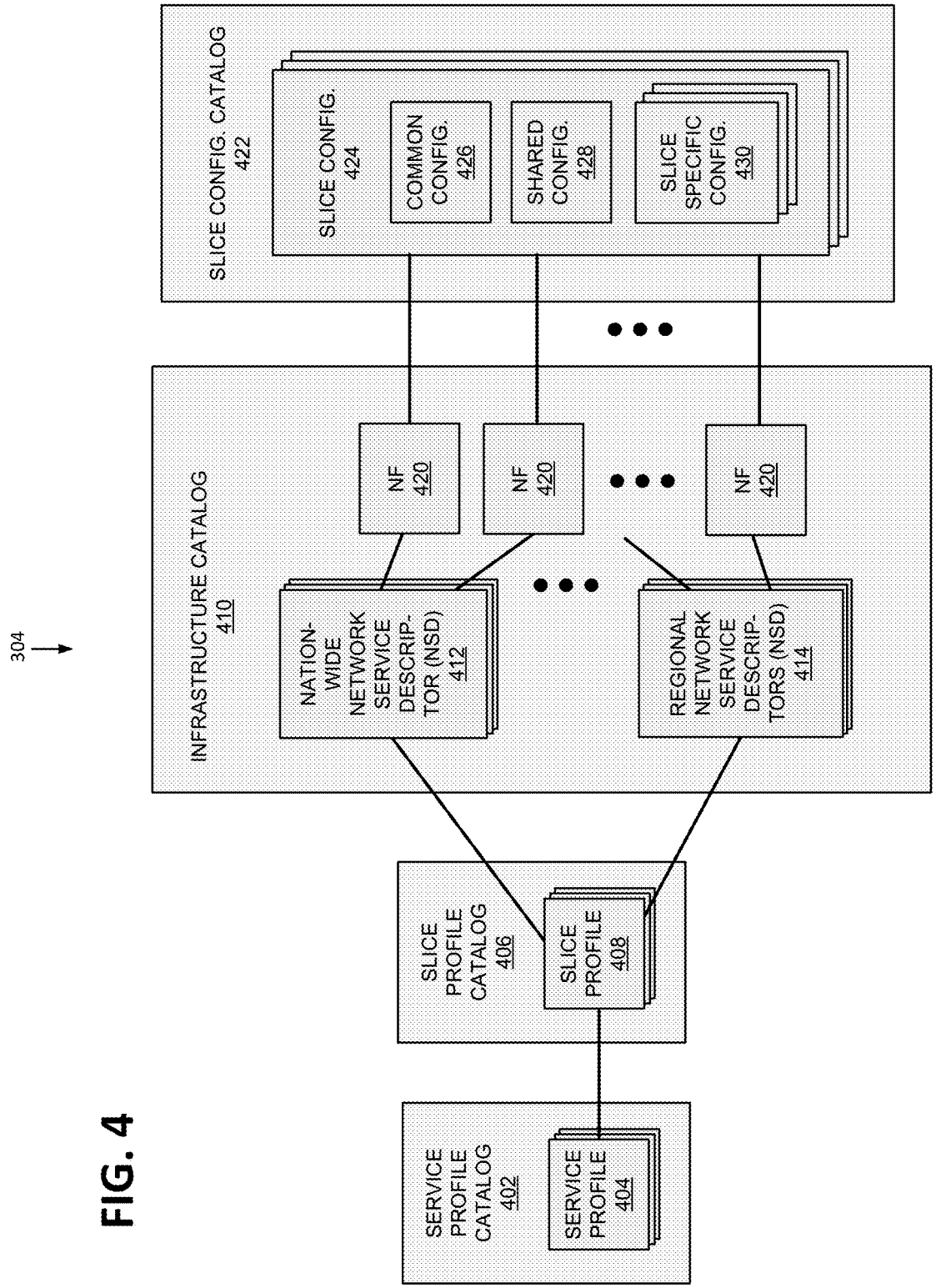
FIG. 4 illustrates exemplary design catalogs and other data stored as descriptors in the catalog database of FIG. 3A, according to one implementation.

FIG. 4 illustrates exemplary design catalogs and other data stored in design catalog database 304 of FIGS. 3A and 3B, according to one implementation. As shown, design catalog database 304 may include a service profile catalog 402, a slice profile catalog 406, an infrastructure catalog 410, and a slice configuration catalog 422. Although not illustrated, design catalog database 304 may include additional or fewer catalogs or other types of data some of which are introduced and described below. Furthermore, in other implementations, each of the catalogs may include profiles different from those illustrated in FIG. 4.

Service profile catalog 402 comprises a set of service profiles 404 that define characteristics of network services. Each service profile 404 references one or more slice profiles 408, to be described below. A service profile also describes service requirements, such as Service Level Agreements (SLAs).

Slice profile catalog 406 comprises a set of slice profiles 408 that define characteristics of network slices. Each slice profile 408 may reference a set of infrastructure profiles. Slice profile catalog 406 may also include slice type profiles (not shown), where each slice type profile describes a type of slice—i.e., network characteristics common across slices of the same type, such as an enhanced Mobile Broadband (EMBB) type, a Low Latency Communications (LLC) type, or a Ultra. Reliable LLC (URLLC) type, a massive Machine Type Communications (MMTC) type, etc.

Infrastructure catalog 410 comprises nationwide network slice service descriptors, which are also sometimes referred to as network service descriptors (NSDs) 412, and regional NSDs 414. Each of NSDs 412 and 414 specifies one or more interconnected network functions (NFs) 420. Each NF 420 of FIG. 4, when deployed, may be instantiated as one of the network functions illustrated in FIG. 1C, such as AMF 134, SMF 136, etc.

Slice configuration catalog 422 comprises a collection of slice configurations 424. Each NF 420 may support a set of slices, and hence, may reference a slice configuration 424. Each slice configuration 424 defines a set of configuration models—specifically a common configuration 426, a shared configuration 428, and a slice specific configuration 430. In some implementations, each of configurations 428-430 includes key-value pairs.

Common configuration 426 specifies configuration parameters for NF 420 that are slice agnostic (i.e., independent of the requirements of a particular slice). Shared configuration 428 specifies configuration parameters, for an NF 420 supporting multiple slices, which are shared by the slices. Shared configuration 428 may change when a reference to a slice is added or removed from an NF 420. In contrast, each slice specific configuration 430 includes configuration parameters that are only used for a single slice. These parameters do not affect NF 420 for other slices. As shown in FIG. 4, each slice configuration 424 may include multiple slice specific configurations 430.

Figure 5:
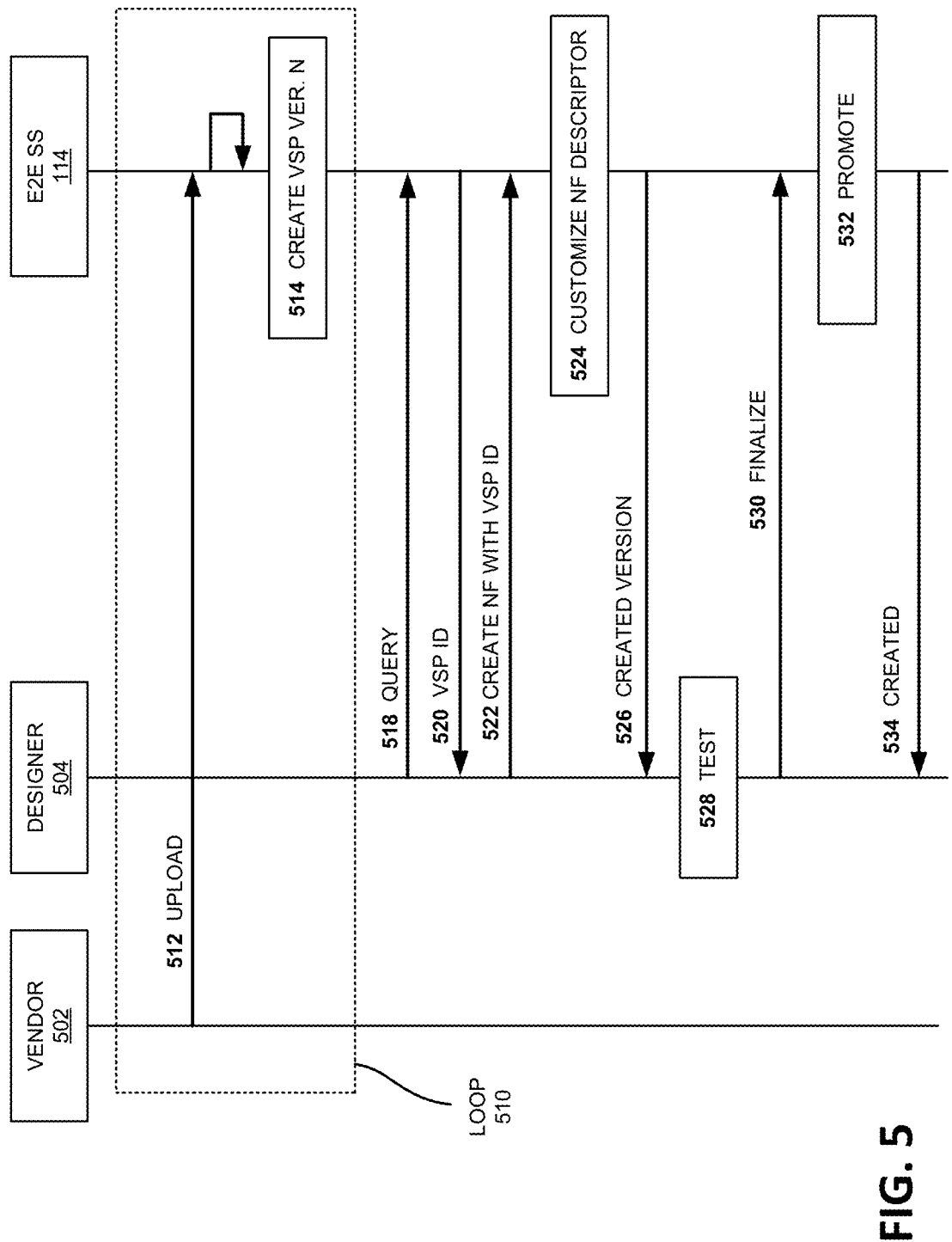
FIG. 5 illustrates a signaling diagram that depicts an exemplary flow of messages between the E2E SS deployment system of FIG. 1A and different network entities to onboard network functions, according to one implementation.

FIG. 5 illustrates an exemplary flow of messages between E2E SS deployment system 114 and different network entities to onboard network functions. Messages are exchanged between a software vendor 502, a network designer 504, and E2E SS deployment system 114. In all signal flow diagrams, each signal may take the form of Application Programming Interface (API) calls or another type of action (e.g., a file transfer protocol (FTP) upload, sending a message or an event, etc.). For simplicity, the signal flow diagrams do not show all signals between the entities. Furthermore, each signal shown may include multiple signals or multiple exchanges of messages.

To begin the process, vendor 502 uploads software for network function (NF) to E2E SS 114 (signal 512), creating a vendor software package (VSP) of a particular version in catalog database 304 (block 514). Upon its creation, the package is assigned a VSP ID. As indicated by dotted box labeled loop 510, the uploading 512 and the version creation 514 may be repeated as many times as there are uploaded programs.

As further shown, designer 504 may query E2E SS 114 for available software packages for NFs (signal 518). In response, E2E SS 114 returns 520 VSP IDs of the software packages stored at E2E SS 114 (signal 520).

Once in possession of VSP IDs, designer 504 may create individual NFs (signals 522). As indicated in FIG. 5, the creation may entail customizing by designer 504 or by E2E SS 114) network function descriptors (block 524). E2E SS 114 then returns a copy of the NF or an NF ID associated with the created version (signal 526). Designer 504 may use the received information to review, test, and approve the particular version of NF (block 528). Designer 504 may then finalize the NF to E2E SS 114 (i.e., indicate to E2E SS 114 that the version is final) (signal 530). E2E SS 114 promotes the finalized NF as a component that may be used in design and creation of network slices/services and/or other components and notifies designer 504 of the promotion.

Figure 6:
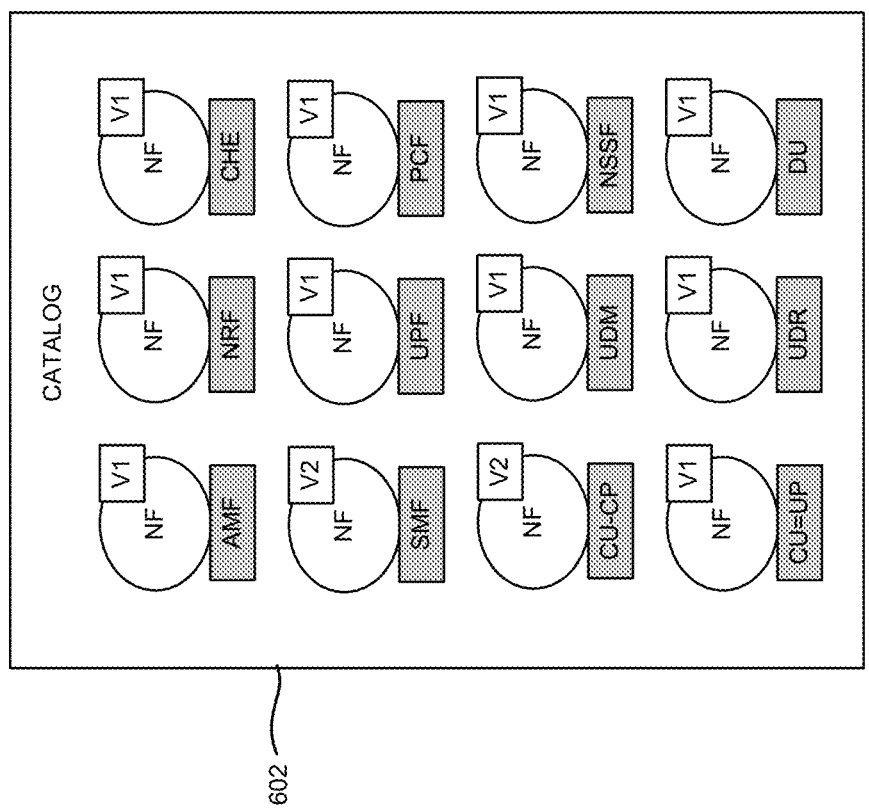
FIG. 6 illustrates exemplary graphical components, in a graphical user interface (GUI) window, which may be used in the E2E SS deployment system of FIG. 1A, that represent the network function components resulting from the process of FIG. 5, according to one implementation.

FIG. 6 illustrates exemplary graphical components, in a graphical user interface (GUI) window, which may be used in the E2E SS deployment system of FIG. 1A, that represent the network function components resulting from the process of FIG. 5. The displayed components in window 602 include software versions of the network components illustrated in FIGS. 1B and 1C and described above with reference to FIGS. 1B and 1C. As shown, NF components include: AMF, NRF, CHE, SMF, UPF, PCF, CU-CP, UDM, NSSF, CU-UP, UDR, and DU. In FIG. 6, each component is associated with a version. Although E2E SS deployment system 114 may onboard many more types of components than those illustrated, they are not shown in FIG. 6 for simplicity.

Figure 7:
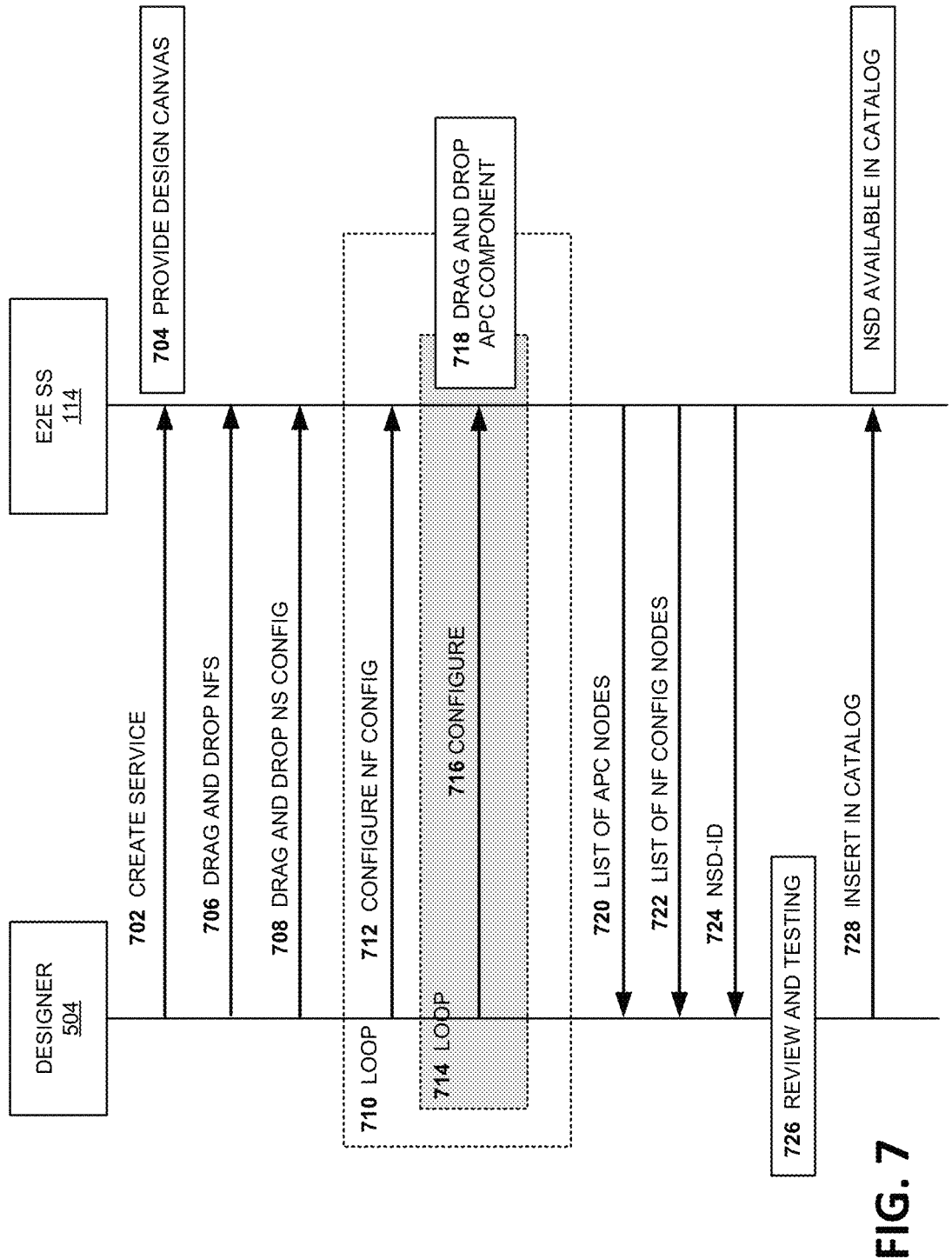
FIG. 7 is an exemplary signaling diagram that is associated with an exemplary process for designing a network service according to one implementation.
Figure 8:
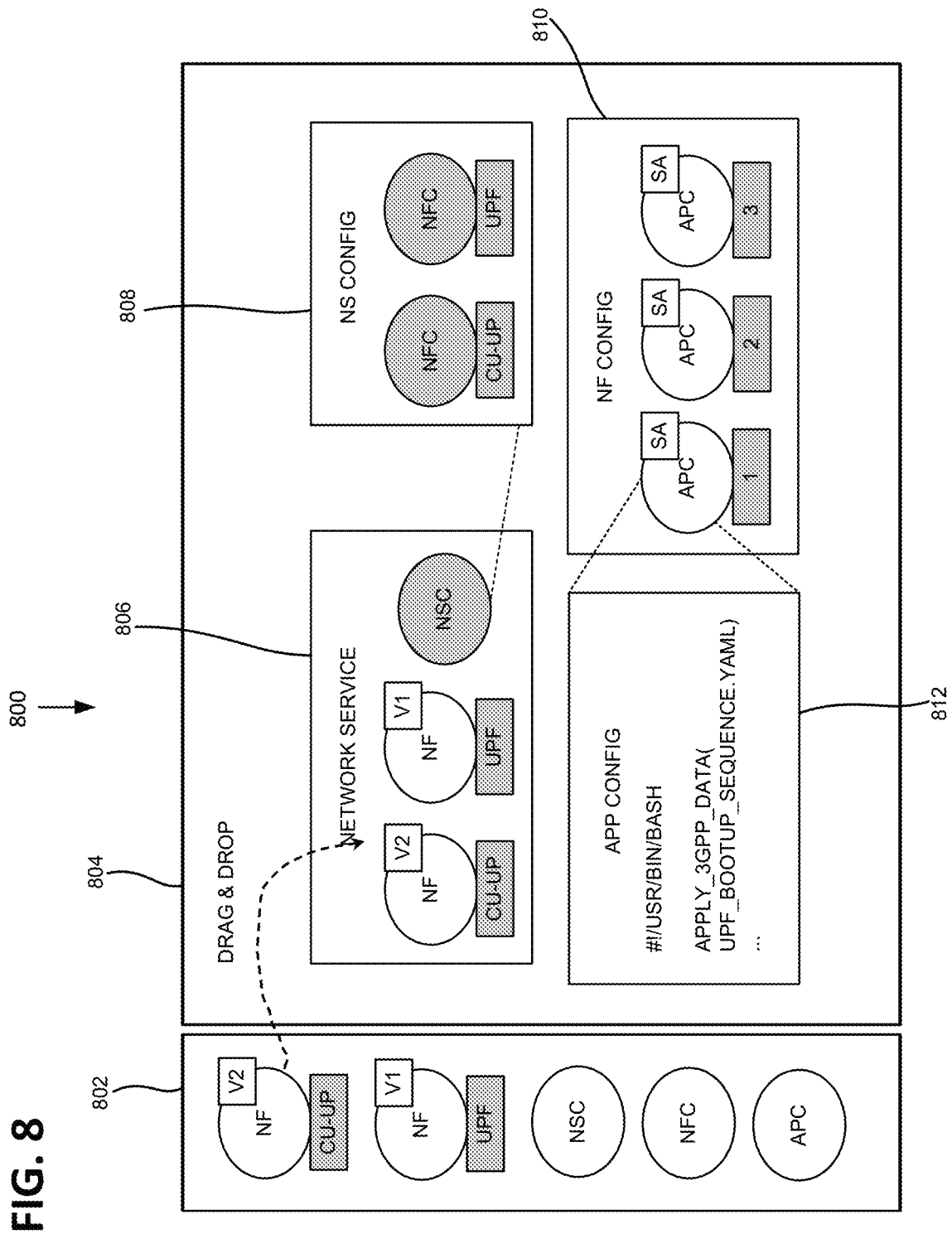
FIG. 8 illustrates a view of an exemplary GUI window for designing the network service of FIG. 7, according to one implementation.

FIG. 7 is an exemplary signaling diagram that is associated with an exemplary process for designing a network service. FIG. 8 illustrates a view of an exemplary GUI window 800 for designing the network service of FIG. 7. Referring to FIG. 7, designer 504 may initiate the design process by sending a request to create a network service to E2E SS deployment system 114 (signal 702). In response, system 114 provides a canvas (e.g., an internal representation of the GUI space shown on the client application (e.g., browser)) (block 704). The network service may be composed with one or more network functions that may be configured according to network service topology. As shown in FIG. 8, designer 504 may design the network service by dragging and dropping, from a panel 802 of available NFs, selected NFs into a network service box 806 within a design window 804 (signal 706). In the example of FIG. 8, the NFs in box 806 include a CU-UP network function Version 2 and a UPF network function Version 1. All on-boarded NFs are available to be placed into the design window 804.

The process of FIG. 7 may further include designer 504 dragging and dropping Network Service Configuration component (NSC) (signal 708) and then entering a loop 710 for configuring each of the Network Function Configuration (NFC) component (signal 712). In FIG. 8, design window 804 includes the dropped NSC 808, which in turn includes NFCs. Each NFCs correspond to the NFs that are present in the NS.

The NFCs may then be configured 716, in a loop 714. The configuration of the NFCs includes configuring Application Configuration components (APCs) in box 810 (box 718) that corresponds to the NEC being configured—each NFC contains APCs that represent application layer configuration of the NF for the current network service context. Each APC provides configuration steps including the configuration packages, the configuration method, and the configuration order/sequence. Each of the APCs in box 810 is labeled SA, meaning that the APC is slice-agnostic configuration (SAC) that is needed for every NF irrespective of the slice for which they may be reconfigured. For example, a typical SAC for an AMF is for tracking a slice-agnostic area. The contents of one of the APC components is illustrated in APC box 812.

After the NFCs and the NSC have been configured, system 114 may provide the list of APC components/nodes for each of the configured NFC (signal 720), a list of NFCs (signal 722), and a network service descriptor ID (NSD-ID) (signal 724) to designer 504. Designer 504 then reviews and tests the network service (block 726). Upon completion of the review and testing, designer 504 inserts the network service descriptor in catalog database 304, making the descriptor available for use in designing other components of a network slice. For example, a network service descriptor may be used in constructing what is referred to herein as an infrastructure deployment unit (IDU).

An IDU encapsulates the concept of a network service that is bound to a particular deployment location. An IDU may include an optional Location Specific Configuration (LSC) component. An LSC may be placed in an IDU to capture any location specific configuration constraints. An LSC may have APC components that capture slice agnostic application configurations but are location specific.

Figure 9:
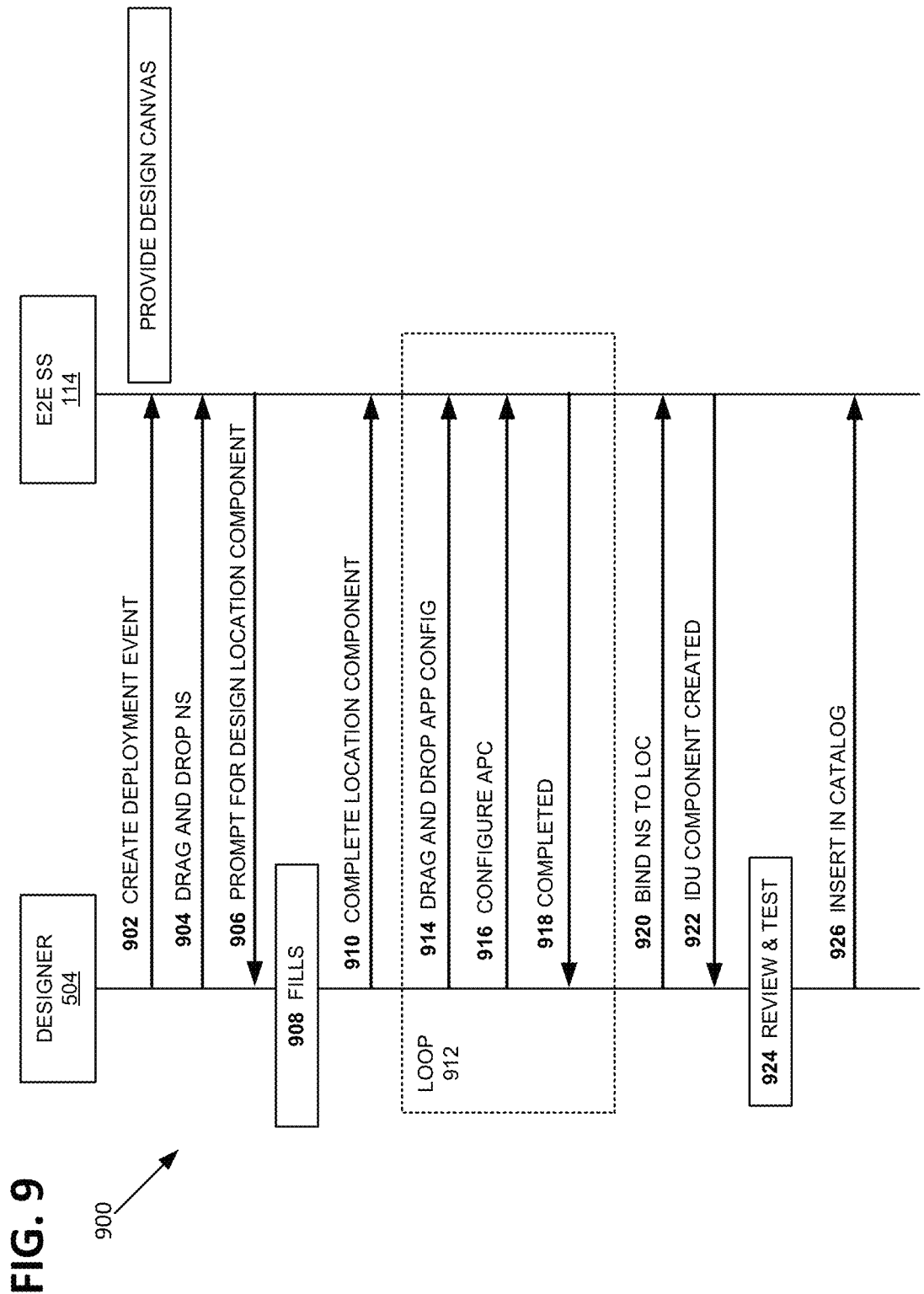
FIG. 9 is a signaling diagram that is associated with an exemplary process for designing an infrastructure deployment unit (IDU) according to one implementation.
Figure 10:
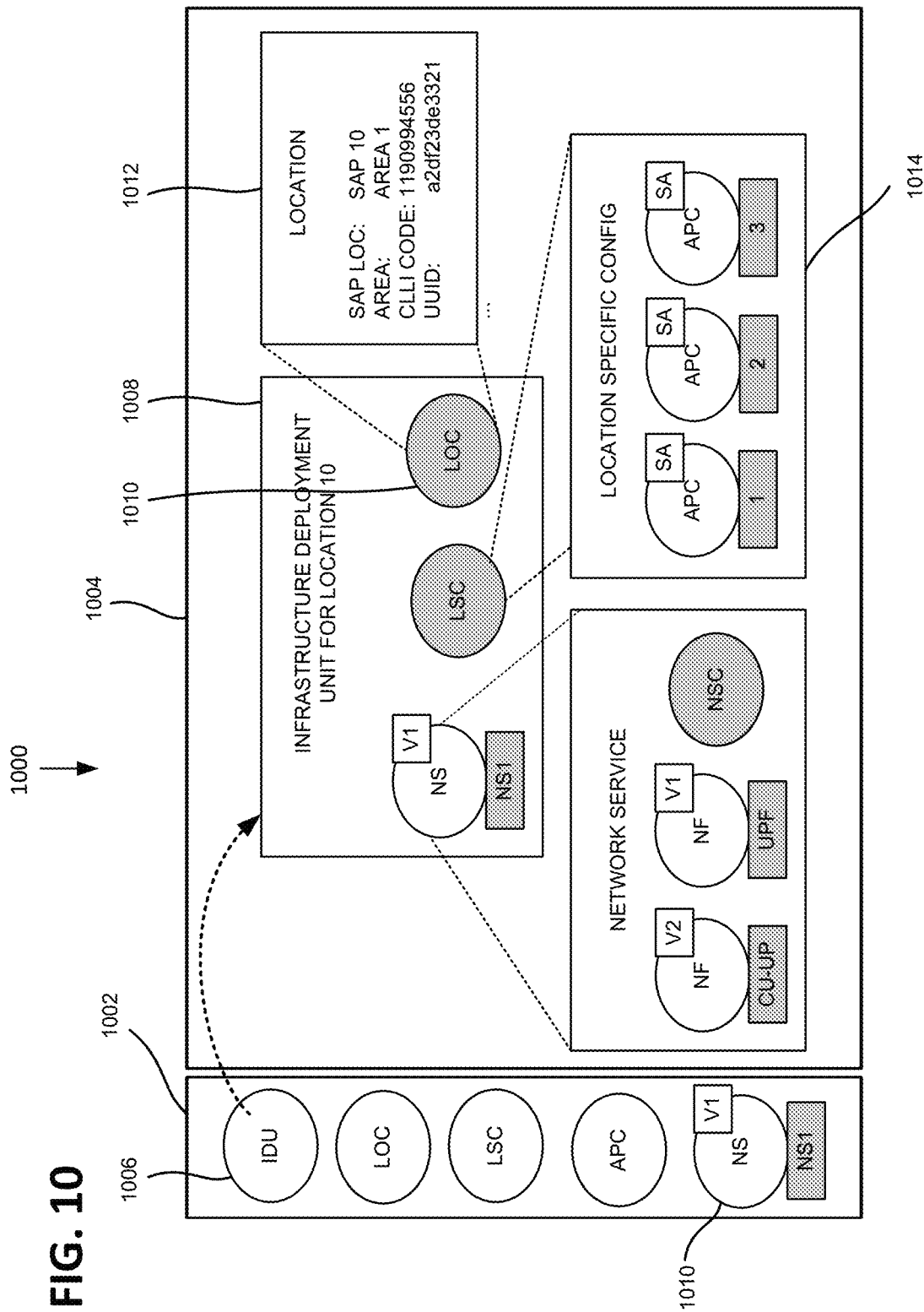
FIG. 10 illustrates a view of an exemplary GUI window for designing the IDU of FIG. 9 according to one implementation.

FIG. 9 is a signaling diagram that is associated with an exemplary process 900 for designing an infrastructure deployment unit (IDU) according to one implementation. FIG. 10 illustrates a view of an exemplary GUI window 1000 for designing the IDU of FIG. 9. Process 900 may be performed by designer 504 and E2E SS deployment system 114. Window 1000 is displayed at designer 504.

As shown, process 900 of FIG. 9 may include sending a signal for system 114 to create an IDU (signal 902). Upon receipt of the signal, system 114 may provide a canvas (i.e., allocate a memory for representing design layout on the server side), and designer 504 may continue the design process by drag-and-dropping one or more NSs (signal 904). All certified NSs are available to designer 504 for use. As shown in FIG. 10, designer 504 may use an IDU 1006 in panel 1002 and place it in design window 1004, to create IDU box 1008. Designer 504 may perform drag-and-drop of NS 1010 into IDU box 1008.

Process 900 may further include E2E SS deployment system 114 prompting designer 504 to figure a location component (LC) (signal 906). A location component uniquely identifies a target deployment cloud that can be either at a network core, a network edge, or a network far-edge. In response to the prompt, designer 504 may fill in details for the location component (box 908). The details may include, for example, codes and/or names of the location. When system 114 detects that the configuration of the location component is complete, system 114 may send a signal to designer 504 (signal 910). FIG. 10 shows a location component 1010, for which designer 504 may be prompted to fill content box 1012. When designer 504 fills content box 1012 with the required information, the signal indicating the completion of the design of the location component 1010 may be sent by system 114 to designer 504.

Process 900 may further include performing loop 912 for an optional component—a location specific configuration (LSC) component. If designer 504 does not associate the IDU with any LSC, then, loop 912 is not performed. Loop 912 may include the following for each network function in the NS: dragging and dropping an application configuration component (APC) (signal 914), configuring the APC (signal 916), and receiving a completion signal from system 114 that the configuration is complete when system 114 detects the completion (signal 918). FIG. 10 shows a location specific component (LSC) box 1014, into which APCs may be dragged and dropped.

Process 900 may further include designer 504 instructing the system 114 to bind the location component to the network service for the IDU (signal 920). After system 114 binds the location component to the NS, system 114 may notify designer 504 that the IDU is created (signal 922). Designer 504 may then review and test the IDU (block 924). Provided that the test is successful, designer 504 may post the IDU to system 114 (signal 926), and render the IDU available for further use, such as for designing a network slice deployment unit (NDU).

An NDU is a wrapper for an IDU and includes a Slice Configuration (SC) component. Each slice configuration component includes a Slice Shared (SS) configuration and/or a Slice Dedicated (SD) Configuration per each network function in the respective Network Service component inside the parent NDU. Different NDUs may share a single IDU—this represents a scenario where common infrastructure is shared to accommodate multiple slices. When E2E SS deployment system 114 encounters a shared IDU during deployment, E2E SS deployment system 114 identifies existing instances of the IDU at the location and reconfigures to add slice specific/slice shared configurations, for the infrastructure to accommodate the slice.

Figure 11:
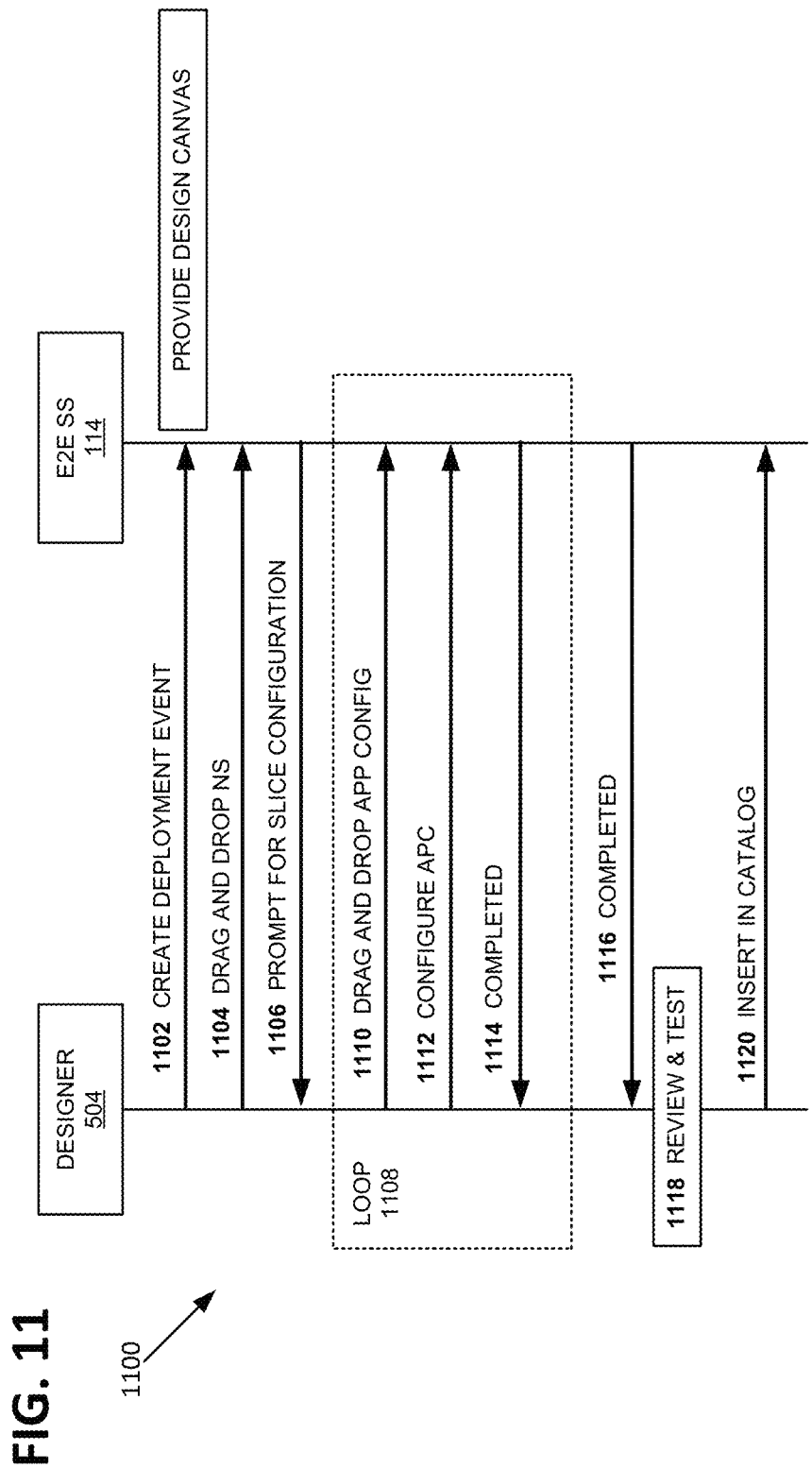
FIG. 11 is a signaling diagram that is associated with an exemplary process for designing a network slice deployment unit (NDU) according to one implementation.
Figure 12:
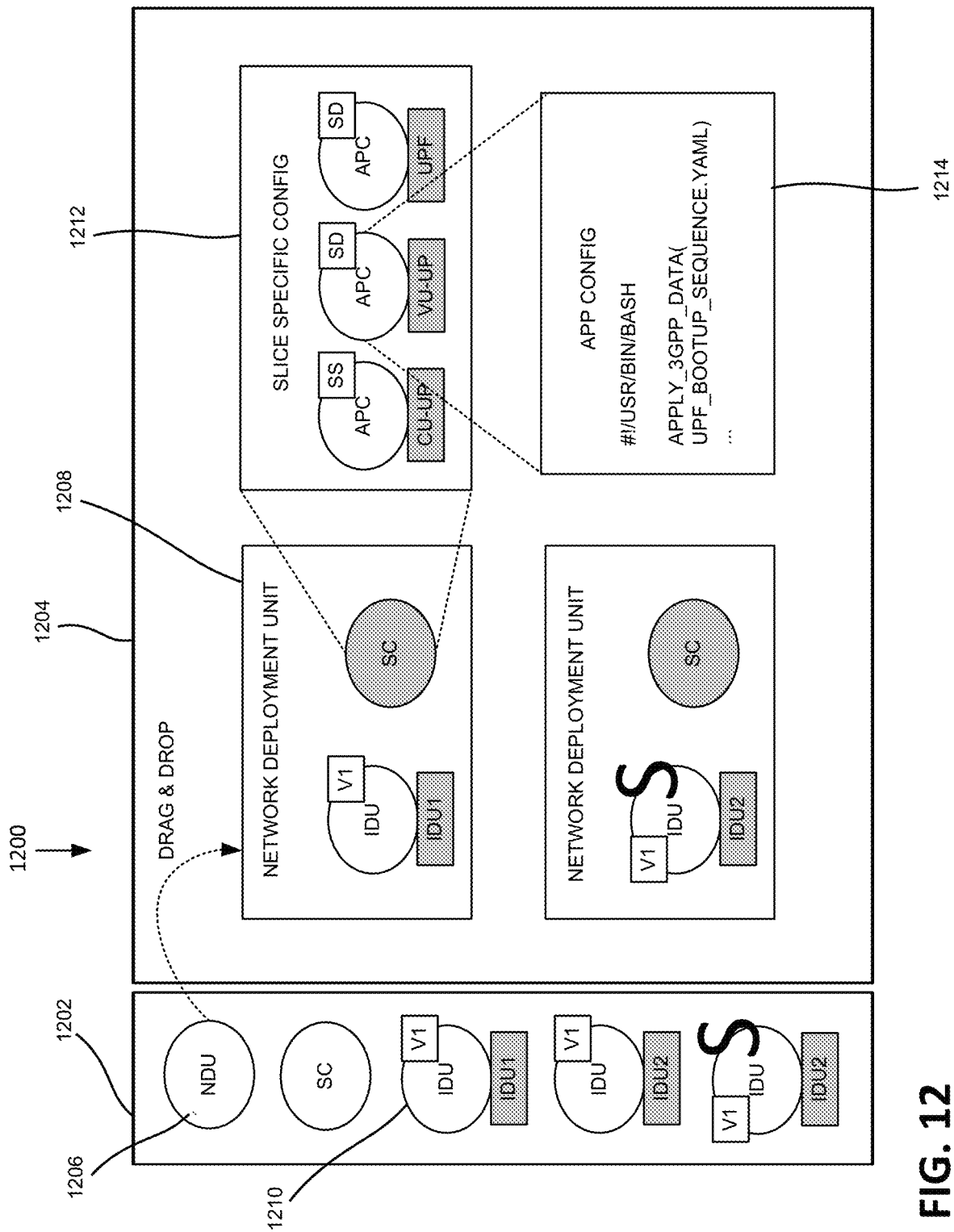
FIG. 12 shows a view of an exemplary GUI windows for designing an NDU of FIG. 10 according to one implementation.

FIG. 11 is a signaling diagram that is associated with an exemplary process 1100 for designing a network slice deployment unit (NDU) according to one implementation. FIG. 12 illustrates a view of an exemplary GUI window 1200 for designing the NDU of FIG. 11. Process 1100 may be performed by designer 504 and E2E SS deployment system 114. Window 1200 is displayed at designer 504.

As shown, process 1100 of FIG. 11 may include sending a signal for system 114 to create a Network Slice Deployment Unit (NDU) (signal 1102). Upon receipt of the signal, system 114 may provide a canvas (i.e., allocate a memory for representing design layout at the server side), and designer 504 may continue the design process by dragging and dropping an IDU (signal 1104). All certified IDUs are available to designer 504 for use. As shown in FIG. 12, designer 504 may create NDU 1206 in panel 1202 within design window 1204, to create NDU box 1208, and perform drag-and-drop of IDU 1210 into NDU box 1208.

Process 1100 may further include E2E SS deployment system 114 prompting designer 504 to configure the slice configuration component (SC) (signal 1106). In response to the prompt, designer 504 and system 114 may enter a loop 1108 for setting parameter values for the SC component (SC). Loop 1108 includes the following for each network function in the NS (of the IDU 1210): dragging and dropping an APC (signal 1110), configuring the APC (signal 1112), and receiving a completion signal from system 114 that the configuration is complete when system 114 detects the completion of APC configuration (signal 1114). FIG. 12 shows a slice configuration (SC) box 1212, into which APCs may be dragged and dropped. FIG. 12 also shows an APC box 1214, whose contents may be configured.

Process 1100 may further include system 114 detecting the completion of the SC configuration and notifying designer 504 that the creation of the NDU is complete (signal 116). Depending on the implementation, the notification may include a copy of the NDU, which designer 504 may review and test (signal 1118). Provided that the review results in the approval the NDU and the test is successful, designer 504 may post the NDU to system 114 (signal 1120) and render the NDU available for further use (e.g., for designing a network slice deployment unit).

Figure 13A:
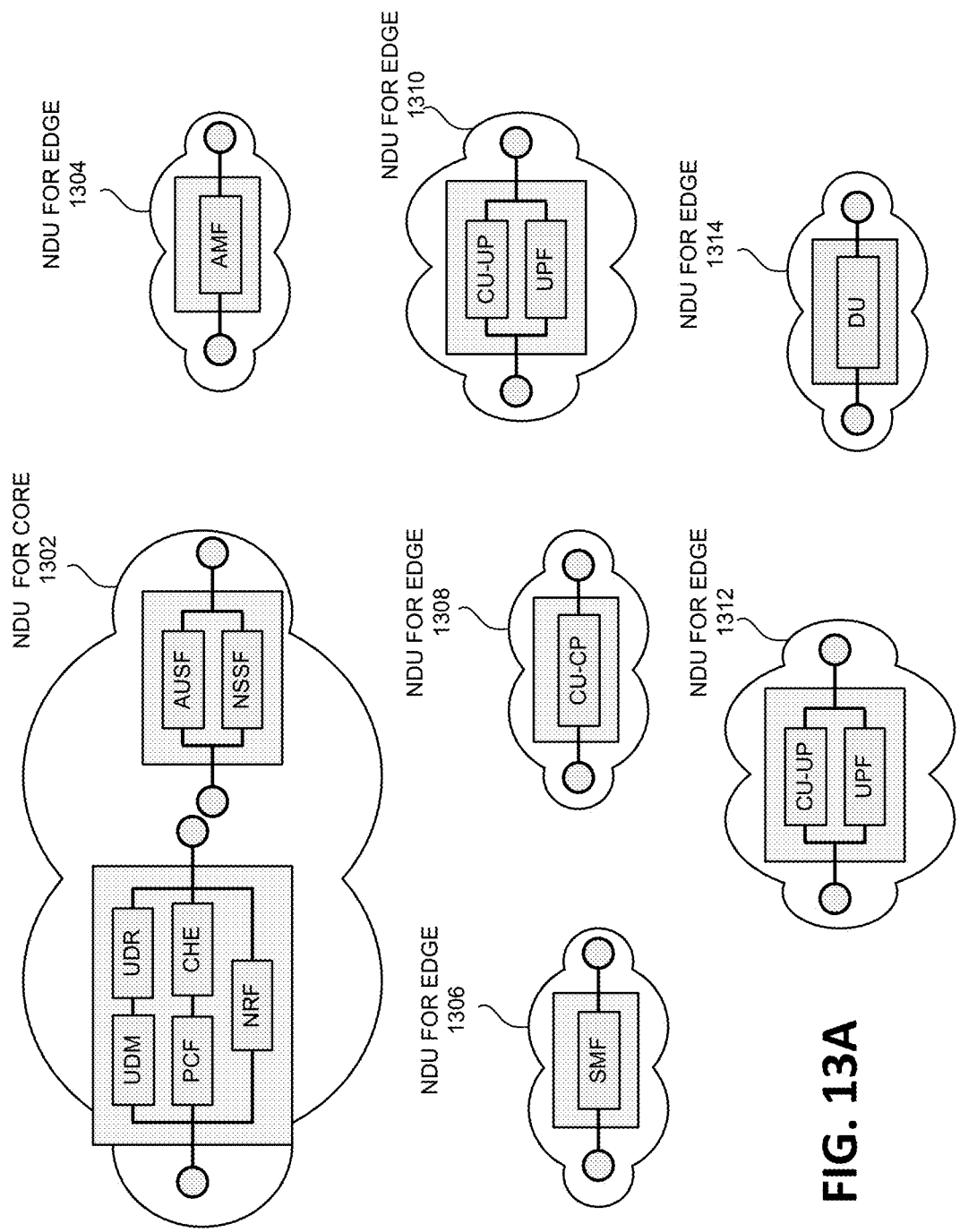
FIGS. 13A and 13B illustrate customizing a deployment plan for a low latency communication slice at a region.
Figure 13B:
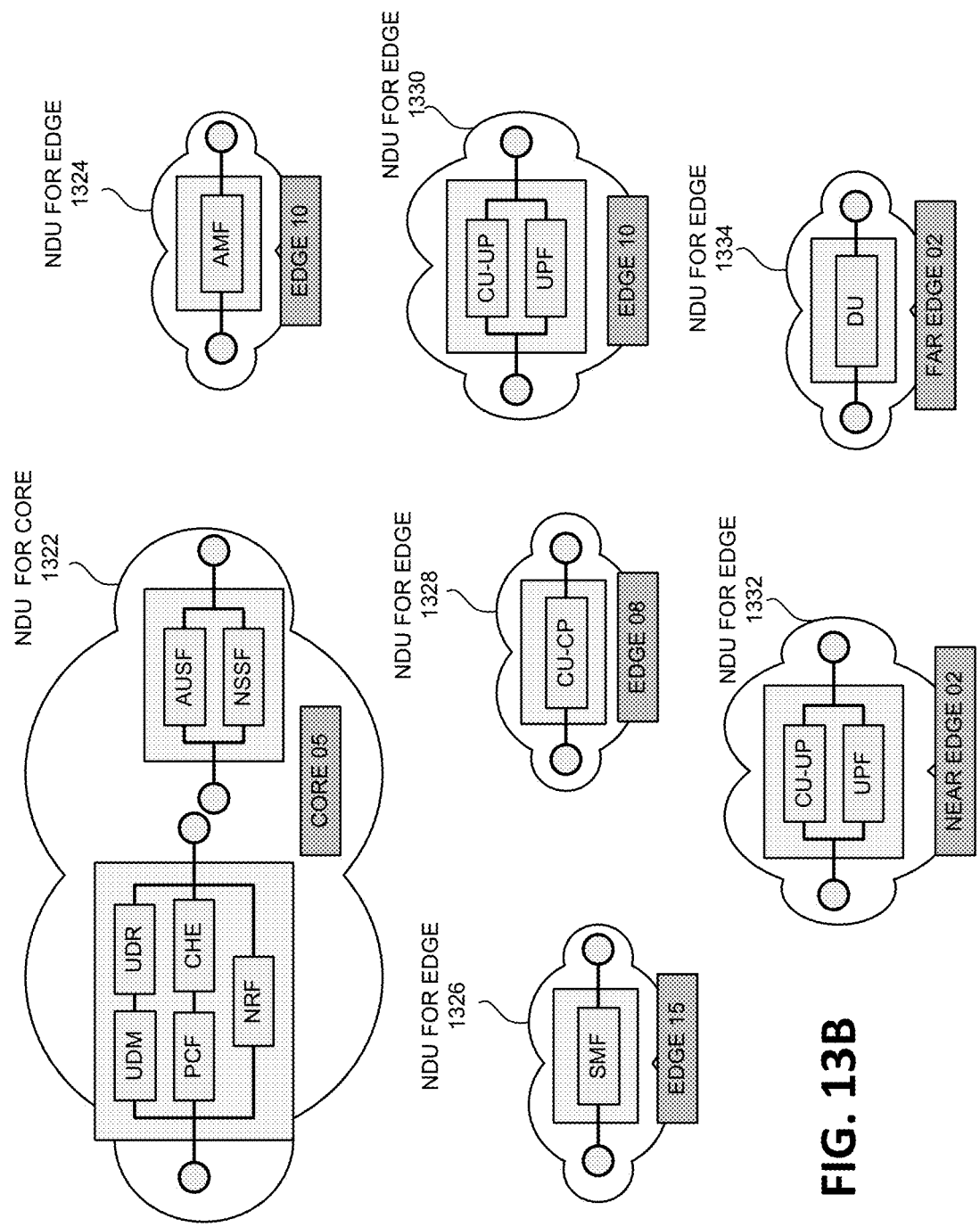

FIGS. 13A and 13B illustrate arriving at a deployment plan for a low latency communication slice at a region. In FIG. 13A, components 1302-1314 represent NDUs for core or edge networks (e.g., NDU 1302 at a core network and NDUs 1304-1314 at edge networks). In developing a deployment plan, NDUs 1302-1314 for a core network and edge networks are selected. Then, for each of the selected NDUs, its slice configuration (SC) component is customized. After the customization of NDUs 1302-1314, for example, one may arrive at NDUs 1322-1334 of FIG. 13B for specific locations. For example, NDU 1322 is for CORE 05, NDU 1312 and NDU 1324-1334 are for EDGE 10, EDGE 15, EDGE 08, EDGE 10, NEAR EDGE 02, and FAR EDGE 02.

Figure 14:
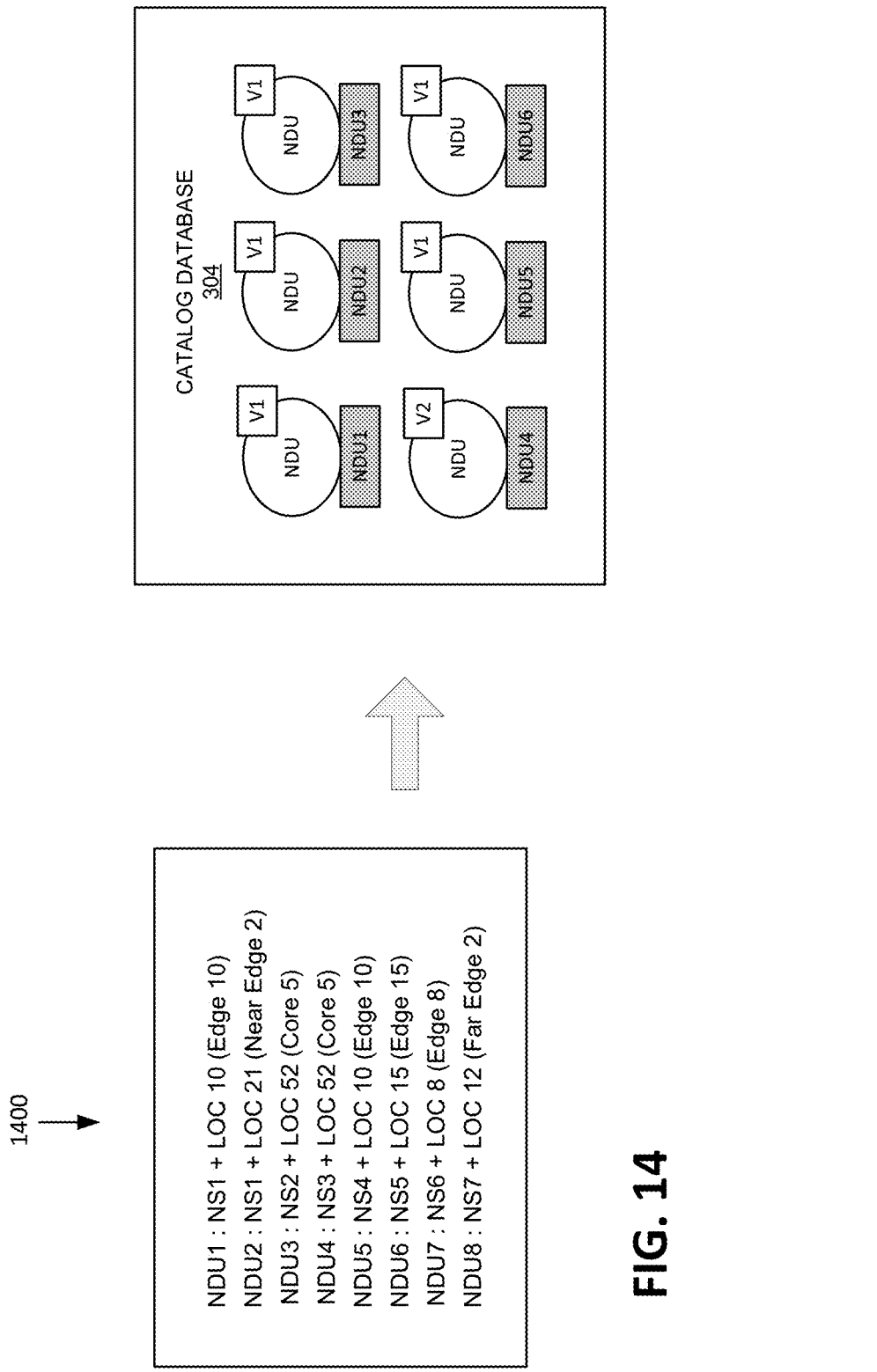
FIG. 14 depicts a summary of the customization illustrated by FIGS. 13A and 13B.

FIG. 14 depicts a summary of the customization illustrated by FIGS. 13A and 13B. In FIG. 14, a list 1400 shows each of the NDUs 1312-1334 whose SCs have been configured (as shown in FIG. 13B). FIG. 14 also shows six of these NDUs 1334 as stored in catalog database. 304. For simplicity, other NDUs are not shown in FIG. 14. These NDUs may be used to design an End-to-End slice service for a given network. In a E2E slice design step, a list of NDUs are identified based on constraints for the deployment plan.

Figure 15:
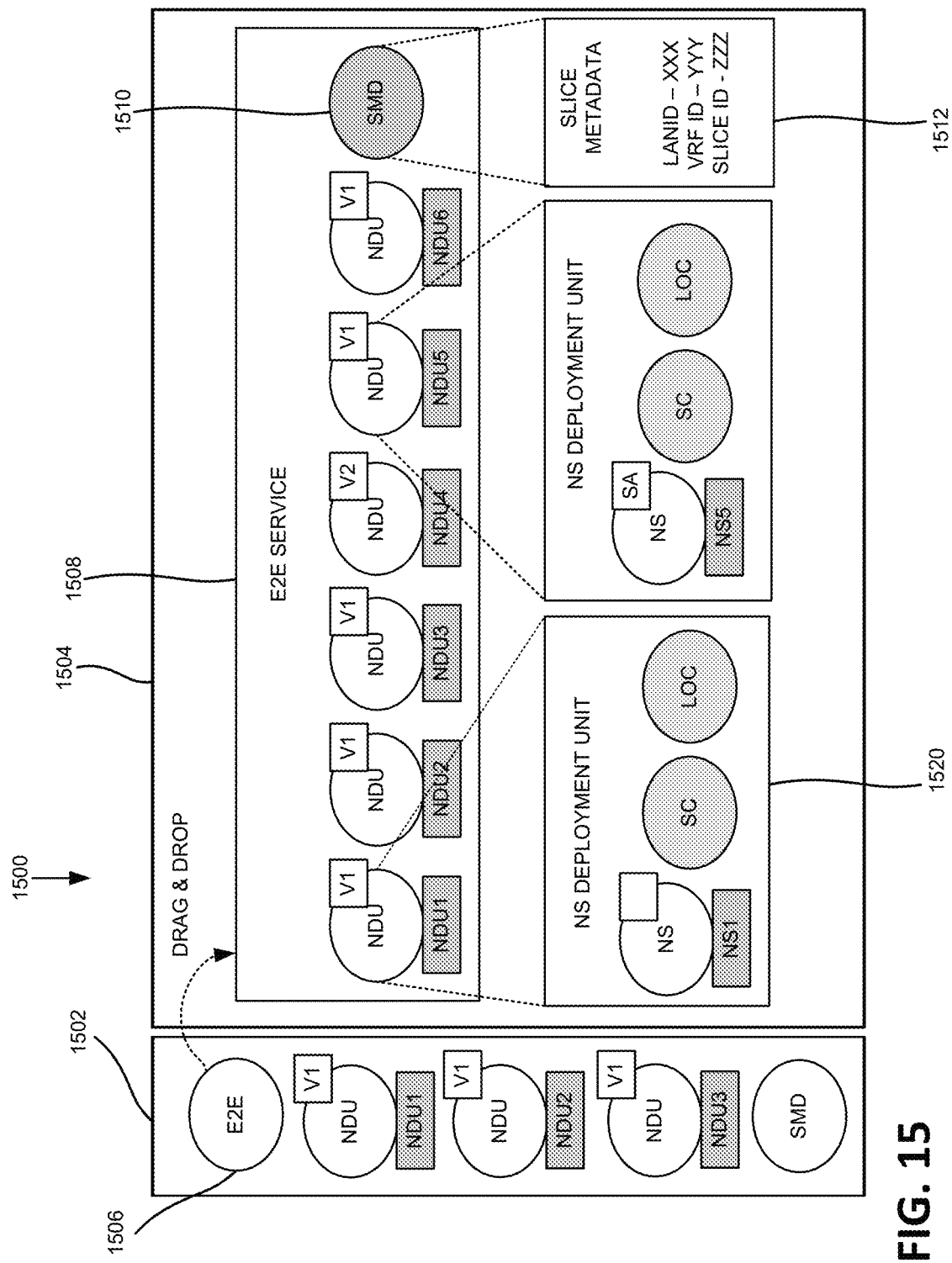
FIG. 15 shows a view of an exemplary GUI window for designing an end-to-end slice service (E2E SS) using network service deployment units (NDUs)

FIG. 15 shows an exemplary view of a GUI window 1500 for designing an end-to-end slice service (E2E SS) using NDUs described above. GUI window 1500 includes a design panel 1502, from which E2E SS component 1506 can be dragged and dropped into window 1504. Within window 1504, E2E SS component 1506 becomes as a E2E SS box 1508. Designer 504 then may place various NDUs in box 1508. For a selected NDU, its contents can be seen from its NDU box, such as NDU box 1520. In FIG. 15, NDU box 1520 is illustrated as exposing its network service (NS) and LOC (which belong to the IDU wrapped by the NDU), and its slice configuration (SC). In each NDU, the SC component can be reconfigured based on applicability to a high-level deployment plan. SCs are reconfigurable, and this permits reuse, with small changes and customizations.

As further shown, E2E SS box 1508 also includes slice meta data (SMD) 1510. An SMD component includes a list of slice specific information that applies to all NDUs for the respective slice. SMD box 2512 illustrates exemplary contents. SMD 1510 may include, for example, a network ID (e.g., a VLAN ID), slice ID, VRF identifier, etc. that characterize the slice to be deployed.

When an NDU is deployed, a Slice Admission control (SAC) is performed for each NDU in a slice instance. If a specific NDU is not allowed, then the SAC checks if the NDU is part of a set of NDUs, to look for a replacement NDU. For providing replacement NDUs, E2E SS deployment system 114 permits design, construction, and use of what are referred to herein as NDU sets, each of which comprises various NDUs. Each NDU set specifies alternate NDU deployment if the primary design cannot be deployed in a network in accordance with its SAC.

Figure 16:
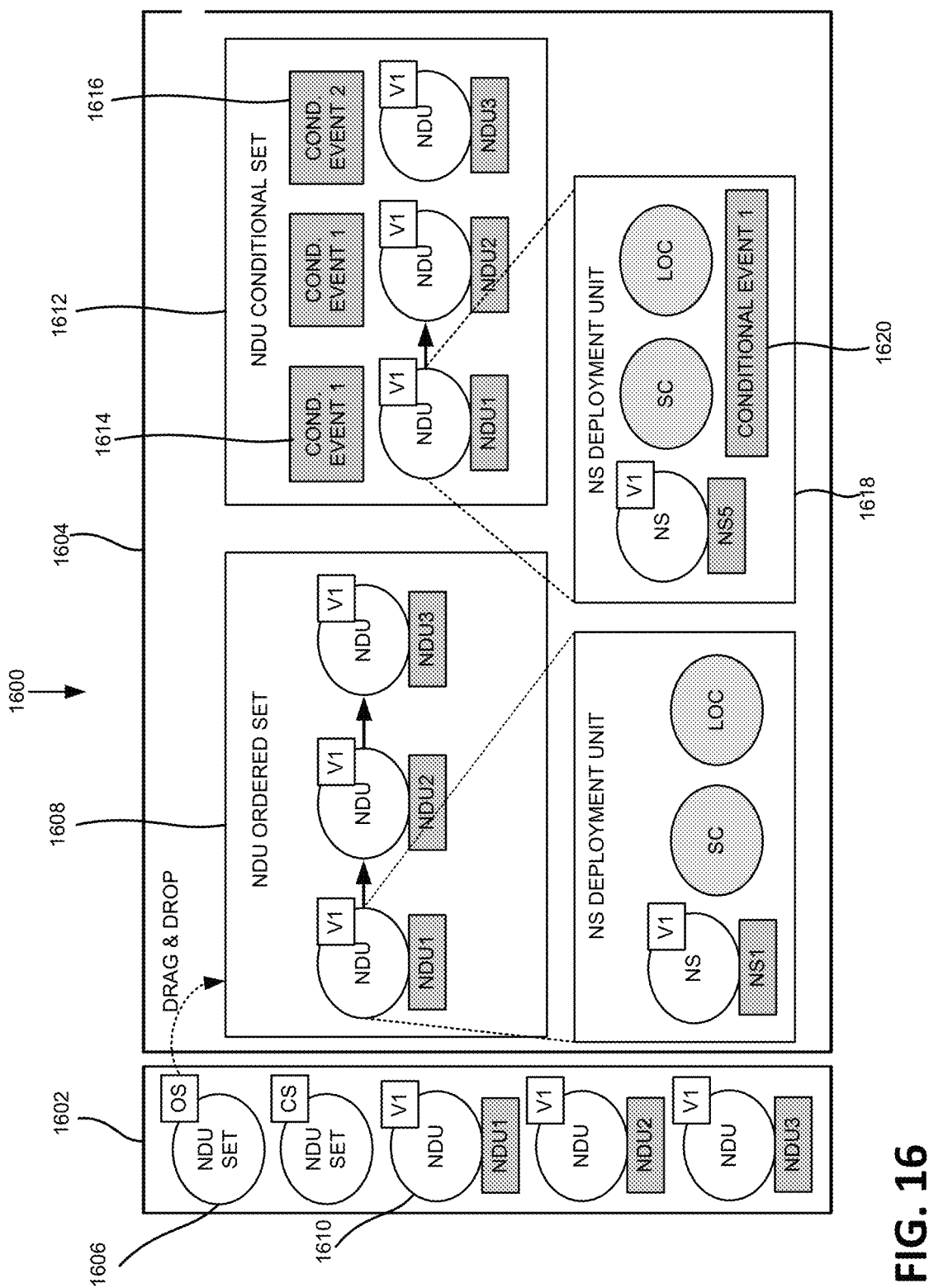
FIG. 16 shows a view of an exemplary GUI window that displays exemplary NDU sets, according to one implementation.

FIG. 16 shows an exemplary view of a GUI window 1600 that displays exemplary NDU sets. GUI window 1600 includes a design panel 1602, from which an NDU set component 1606 can be dragged and dropped into window 1604, to create and configure an NDU set. Placing component 1606 within window 1604 creates an NDU set component instance (shown as an NDU ordered set box 1608 in FIG. 16) into which various NDUs can be placed. An NDU set can be one of two types: an ordered NDU set or a conditional NDU set. NDU set 1606 is an ordered NDU set and includes multiple NDUs. These NDUs are arranged in the preferred order of deployment; if particular conditions for deployment do not permit the deployment of one NDU, a different (e.g., next) NDU is deployed. As shown in box 1608, NDU set 1606 includes NDU1, NDU2, and NDU3. Accordingly, if NDU1 deployment is not permitted, then NDU2 is deployed; and if NDU2 is not permitted, NDU3 is deployed, etc.

Window 1604 also shows the contents of a conditional NDU set 1610, in NDU conditional set box 1612. These NDUs of the conditional NDU set represent an NDU that will be deployed under particular deployment policy, expressed by a conditional event 1614. Under event 1614, thus, NDU1 is deployed; and if NDU1 is not permitted to be deployed, NDU2 would be deployed. Under conditional event 1616, NDU3 would be deployed. For NDUs with a common conditional event, the order of preference can also be specified. NDU conditional set box 1618 for the NDU1 indicates that it is associated with a conditional event 1, with a flag/image 1620. Once an NDU set is defined, the NDU set can be used in designing an E2E SS.

Figure 17:
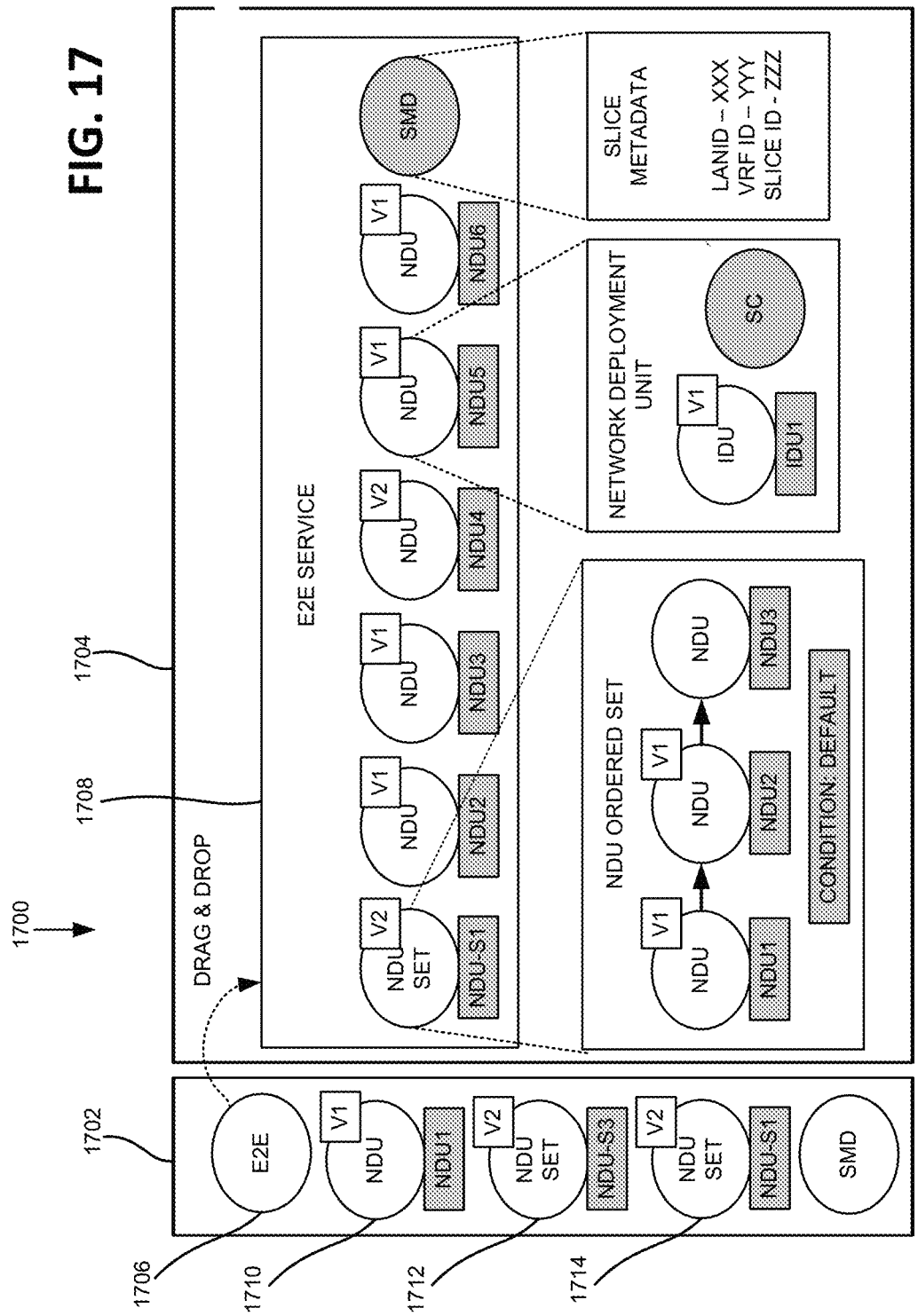
FIG. 17 shows a view of an exemplary GUI window for designing an E2E SS using NDU sets.

FIG. 17 illustrates an exemplary view of a GUI window 1700 for designing an E2E SS using NDU sets. As shown, GUI window 1700 includes a design panel 1702 and design window 1704. Design panel 1702 includes components that a user can select and drag-and-drop into design window 1704 to design the E2E SS. More specifically, design panel 1702 includes an E2E SS component 1706, NDU 1710, NDU set 1712, and NDU set 1714. When a user drops E2E SS component 1706 into window 1704, a E2E SS box 1708 opens, allowing the user to place NDUs and/or NDU sets into the box 1708.

As discussed above, E2E SS deployment system 114 allows network operators to design and deploy not only network slices, but also slice assurance services (SAS). An SAS includes a number of services for determining or monitoring the quality of service that a slice renders, such as tracking a Key Performance Indicator (KPI) parameter values. An SAS can be part of an E2E SS, and can be constructed starting with basic component parts, referred to herein as Assurance Modules. Assurance Modules can then be used to construct Assurance Deployment Unit (ADU). An SAS can then be constructed using ADUs and used to construct an E2E SS component.

Figure 18:
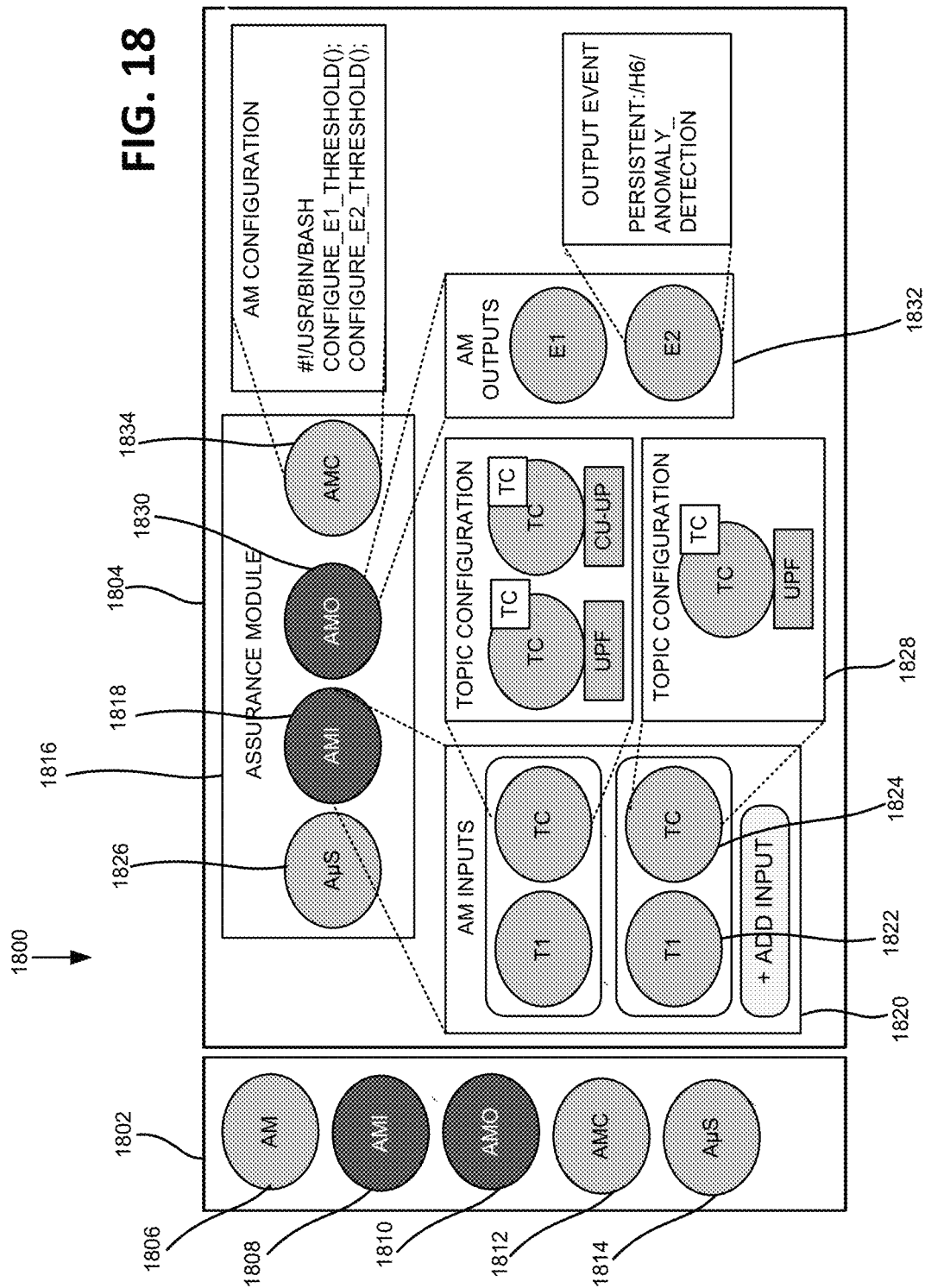
FIG. 18 depicts a view of an exemplary GUI window for designing an exemplary assurance module.

FIG. 18 depicts an exemplary view of a GUI window 1800 for designing an exemplary assurance module (AM). As shown, GUI window 1800 includes a design panel 1802 and a design window 1804. Design panel 1802 shows representations for an AM and components within an AM. More specifically, design panel 1802 includes an AM 1806, AM Input (AMI) 1808, AM Output (AMO) 1810, AM Configuration (AMC) 1812, and Assurance Micro-service (AμS).

AM 1806 represents a template for an assurance module (AM) that includes assurance analytics functions. The functions may be created per KPI, slice, or group of KPIs per slice. AM 1806 can be placed within design window 1804 to start the AM design process. When placed in window 1804, AM 1806 may open into AM box 1816 (representing an AM component/instance). In FIG. 18, AM box 1816 includes AMI 1818, AMO 1830, AMC 1834, and AμS 1826. These components would have been dragged-and-dropped from the corresponding templates 1808-1814 in panel 1802.

AMI 1808 represents a template for AM inputs. AM box 1816 shows the corresponding AMI 1818 instance. As the AMI box 1820 for AMI 1818 reveals, AMI 1818 includes combinations of Topic 1822 and a Topic Configuration (TC) 1824. Topic 1822 describes the topic and the corresponding message bus to which the AM 1816 is subscribed, in order for the AμS 1826 (corresponding to AμS 1814) to perform its logic. TC 1824 is associated with the topic and represents a set of NF configuration components that stream metrics for the corresponding topic. TC 1824's contents are shown in TC box 1828.

AMO 1810 represents a template for AMO 1830. AM box 1816 shows the corresponding AMO 1830 for AM 1816. As the AMO box 1832 for AMO 1830 reveals, AMO 1830 includes output events that the AM is programmed to emit based on the AμS logic. The output events include messages on a topic bus, to which AM 1816 listens.

AMC 1812 represents a template for the AM configuration. AMC 1834 instance in AM 1816 includes a set of actions exposing the interface to remotely configure the AM 1816 by E2E SS deployment system 114 at runtime, if needed. A typical configuration may include reconfiguration values for thresholds for KPIs or other computed parameters, for the input topics, for example.

AμS 1814 represents a template for micro services. AμS 1826 instance includes specific analytics functions or operations for producing KPIs of interest from obtained network metrics. These KPIs may be used in offering an SLA based slice assurance service.

Figure 19:
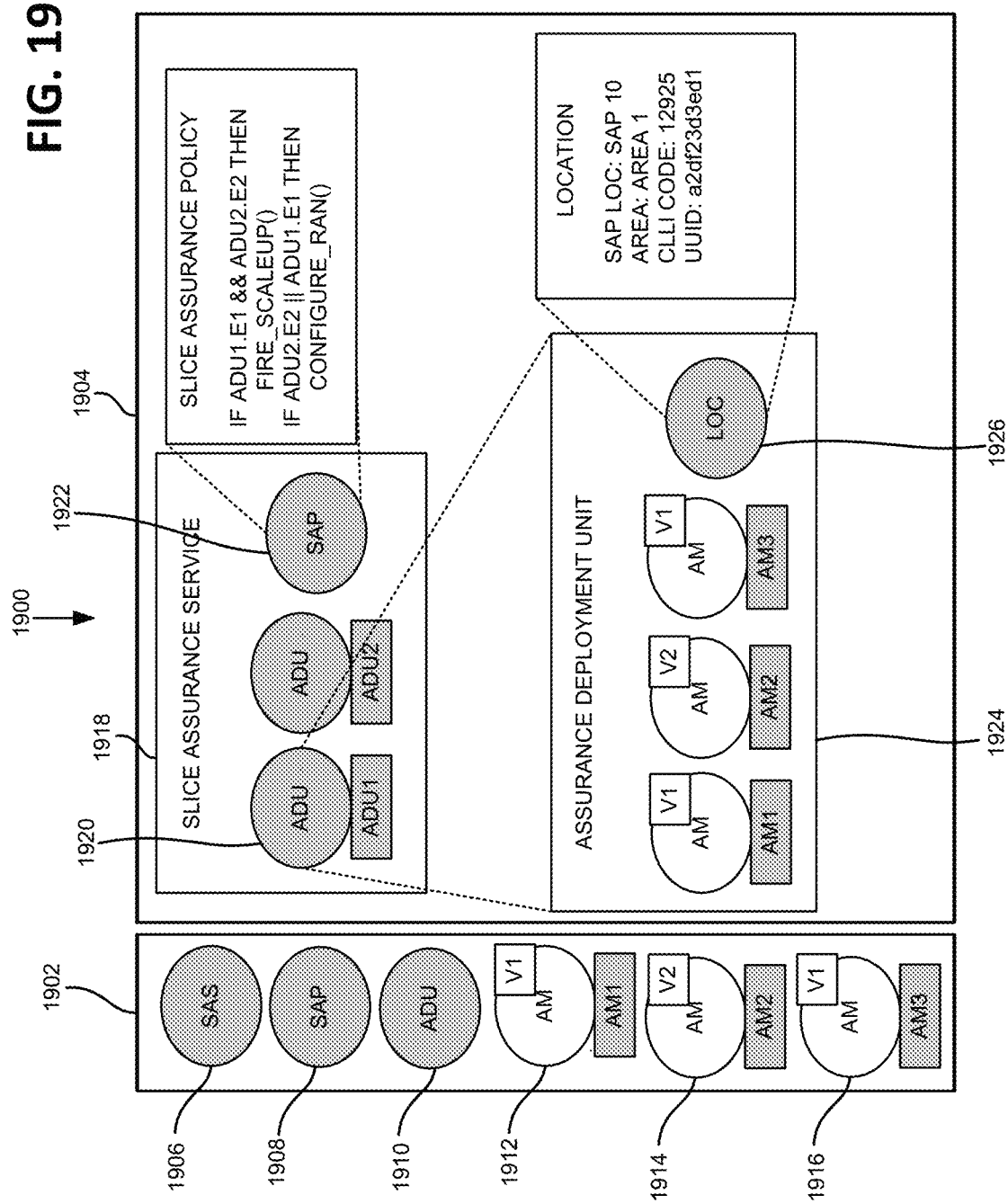
FIG. 19 depicts a view of an exemplary GUI window for designing an exemplary Assurance Deployment Unit (ADU) and an exemplary slice assurance service (SAS)

AM instances that have been designed, for example, using GUI window 1800, may be used to construct assurance deployment units, which in turn may be used to construct slice assurance services. FIG. 19 depicts a view of an exemplary GUI window 1900 for designing exemplary Assurance Deployment Units (ADUs) and an exemplary Slice Assurance Service (SAS). As shown, GUI window 1900 includes a design panel 1902 and a design window 1904. Design panel 1902 shows an SAS and components within the SAS. More specifically, design panel 1902 shows SAS 1906, Slice Assurance Policy (SAP) 1908, ADU 1910, and AMs 1912, 1914, and 1916.

SAS 1906 represents a template for an SAS. SAS box 1918 represents the corresponding SAS instance, created by dragging and dropping SAS 1906 into window 1904. As shown in FIG. 19, SAS box 1918 includes ADUs, one of which is labeled as ADU 1920, and an SAP instance 1922. ADU 1920 wraps an AM and binds the AM to a location 1926, as shown by ADU box 1924.

SAP 1908 represents a template for an SAP, such as SAP 1922. SAP 1922 specifies the policy for interpreting output events of each ADU (and therefore AM) inside SAS 1918. SAPs are interpreted by a policy engine within E2E SS deployment system 114 at runtime, for making sense of output events emitted on a message bus by AMs deployed at a particular location.

ADU 1908 represents a template for an ADU, such as ADU 1920. As shown by ADU box 1924, ADU 1920 includes AMs and a location object (LOC), such as a LOC 1926. AMs may be added to an ADU by dragging and dropping one of AMs in design panel 1902, such as AMs 1912-1916, in box 1924. Through ADUs, an SAS effectively encapsulates what AMs are to be deployed in which location and how that AM is configured.

Figure 20:
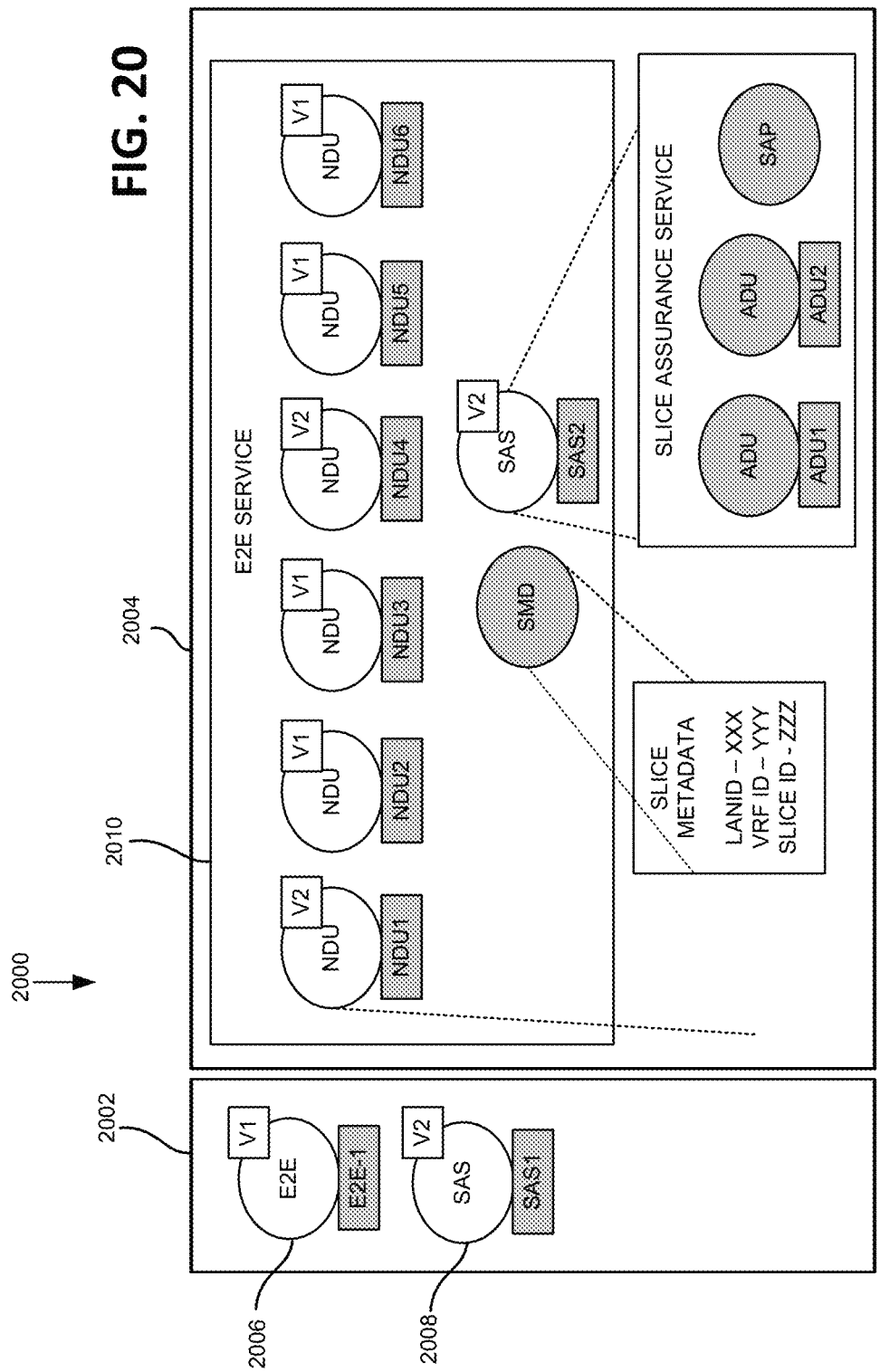
FIG. 20 illustrates a view of an exemplary GUI window for binding an exemplary SAS to a particular network slice.

FIG. 20 illustrates a view of an exemplary GUI window 2000 for binding an exemplary SAS to a particular E2E SS. As shown, window 2000 includes a design panel 2002 and a design window 2004. Although panel 2002 may include other components that may be used in designing an E2E SS, they are not illustrated in FIG. 20 (e.g., NDUs). Design panel 2002 includes an E2E SS template 2006 and an SAS template 2008. Dragging and dropping E2E SS 2006 into window 2004 begins the design process, opening E2E SS box 2006. A network designer may add components from panel 2002 into E2E SS box 2006, such as SAS 2008 and other components (e.g., NDUs) (not shown). One consequence of the binding is that E2E SS 2020 not only contains information on how a slice infrastructure is to be setup, how it is to be configured per location, per region, per NF and what slice specific metadata has to be applied, but also that E2E SS 2010 also contains information about setting up SASs for the slice.

Figure 21:
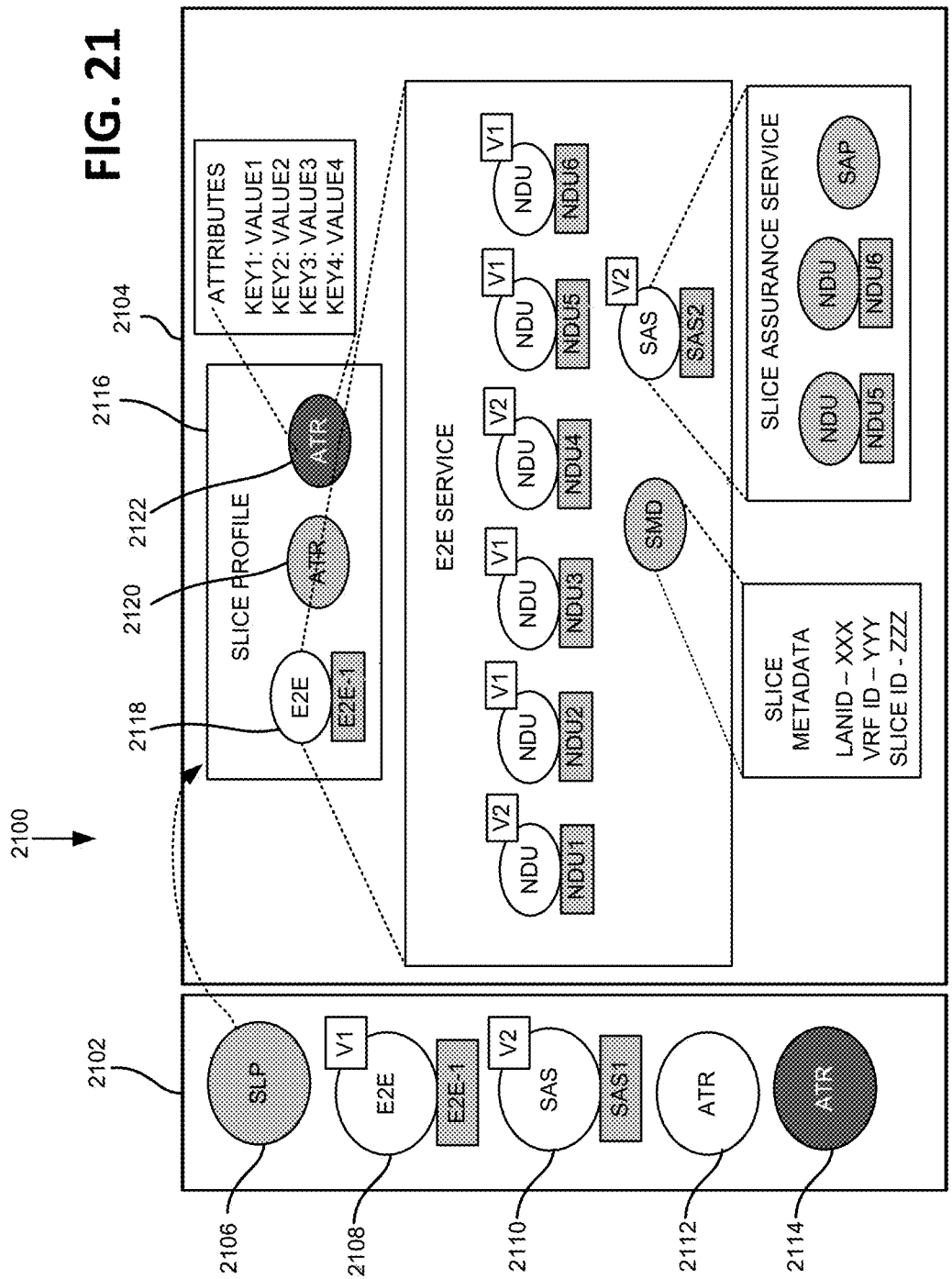
FIG. 21 illustrates a view of an exemplary GUI window that displays an exemplary slice profile.

Once designed, an E2E SS may be used for specifying a slice profile. FIG. 21 illustrates an exemplary view of a GUI window 2100 for specifying a slice profile. As shown, window 2100 includes a design panel 2102 and a design window 2104. Design panel 2102 includes a slice profile 2106, E2E SS 2108, SAS 2110, and attributes 2112. Slice profile 2106 may be dragged and dropped into window 2104 to begin the design process, opening SLP box 2116 that represents a slice profile instance. An E2E SS and an SAS have been described previously. E2E SS 2108 may be placed in SLP box 2116, to create an E2E SS 2118 instance. SAS 2110 can be placed within the E2E SS box for E2EE SS 2118.

Attributes (ATR) 2112 and/or 2114 are templates for key-value pairs, of different types. These may be placed in SLP box 2116, to create ATR instances 2120 and 2122. SLP 2116 represents E2E SS 2118 bound to ATRs 2120 and 2122.

Figure 22:
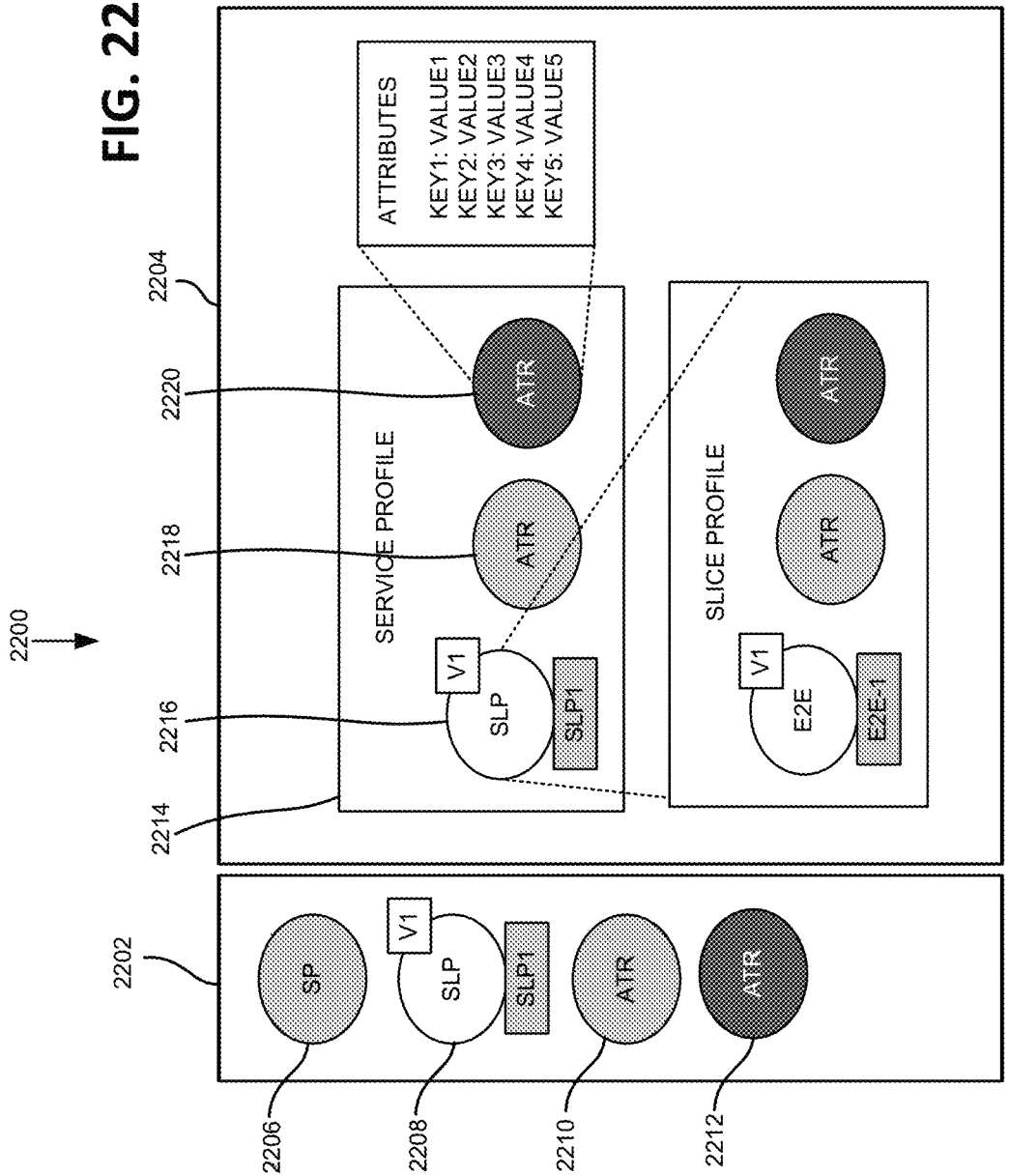
FIG. 22 illustrates a view of an exemplary GUI window that displays an exemplary service profile.

Slice profiles that have been designed may be used to construct service profiles. FIG. 22 illustrates an exemplary view of a GUI window 2200 for specifying a service profile. As shown, window 2200 includes a design panel 2202 and a design window 2204. Design panel 2202 includes a service profile 2206, SLP 2208, ATR 2210, and ATR 2212. Service profile (SP) 2206 may be dragged and dropped into window 2204 to begin the design process, opening SP box 2214 that represents a service profile instance.

An SLP and ATRs have been described previously. SLP 2208 may be placed in SP box 2214, to create a service profile instance. ATR 2210 and/or 2212 are templates for key-value pairs, of different types, and may be placed in SP box 2214, to create ATR instances 2218 and 2120. SP 2214 represents SLP 2216 bound to ATRs 2218 and 2220.

An E2E SS describes network slices for subnets. Each of slice subnets is further composed of multiple deployment units. To put these deployment units to work, E2E SS deployment system 114 performs a high level orchestration of workflows that include parsing the top-level descriptors to decompose them into multiple subnet level descriptors, and then deploying multiple parts in parallel or in a specific sequence, in order to fully deploy the entire network slice. However, for some implementations, within a provider network, subcomponents of a network slice (e.g., network functions) and/or a subnet may be operated by a dedicated network operations team, and each operations team may plan the deployment of the network functions within the subnet in accordance with its own schedule. Hence, deployment of a network slice may entail a specific workflow orchestration. Implementation of such a deployment process is described below with reference to FIG. 23. In a different implementation, a deployment process may be more flexible, as it relies on many of the components described above, such as configuration components, location components, etc. Such a deployment process is described below with reference to FIGS. 24A-24C.

Figure 23:
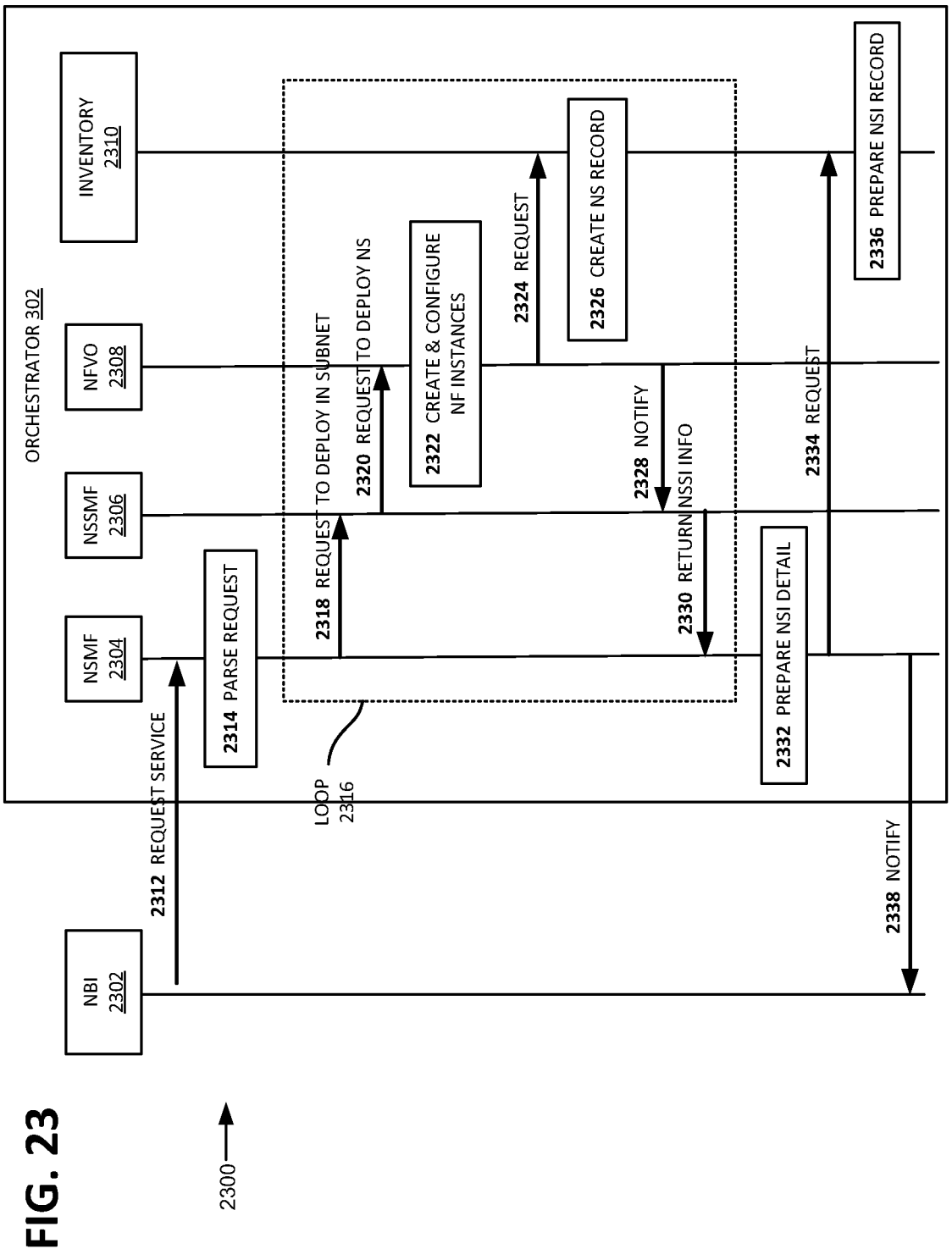
FIG. 23 is a signaling diagram that is associated with an exemplary slice deployment process according to one implementation.

FIG. 23 is a signaling diagram that is associated with an exemplary slice deployment process 2300 according to one implementation. Process 2300 involves exchanges of messages between and performance of actions at Northbound Interface (NBI) 2302 and various components of orchestrator 302, of E2E SS deployment system 114. Orchestrator 302 includes Network Slice Management Function (NSMF) 2304, Network Slice Subnet Management Function (NSSMF) 2306, Network Function Virtualization Orchestrator (NFVO) 2308, and Inventory Management 2310. The functions of components 2302-23'0 are described below along with process 2300.

As shown, process 2300 includes NBI 2302 sending a request for service deployment to NSMF 2304 in orchestrator 302 (signal 2312). NBI 2302 includes the client side of the network interface for orchestrator 302, for managing service/slice deployment over the network. The request may include an identifier for a target service/slice profile, and in response to the request, NSMF 2304 may fetch the profile and parse the profile (box 2314). By parsing the profile, NSMF 2304 may identify a list of slice subnet descriptors (e.g., NDUs).

Process 2300 further includes entering a loop 2116 to perform a set of actions for each of the subnets. Loop 2316 may begin with NSMF 2304 sending a request to NSSMF 2306, to deploy a subnet slice in the particular subnet (signal 2318). NSSMF 2306 then instructs NFVO 2308 to instantiate the corresponding NFs (signal 2320). In response, NFVO 2308 creates and configures NF instances (block 2322). NFVO 2310 then sends a request to create a record for the network service, to inventory manager 2310 (signal 2324). Inventory manager 2310 creates and inserts the record in its database (block 2326). NFVO 2308 then notifies NSSMF 2306 the completion of the creation of the NF instance (signal 2328), and NSSMF 2306 returns Network Service Slice Instance detail (signal 2330). These actions and signaling in loop 2316 may be performed for each of the subnets.

After performance of loop 2316, NSMF 2304 prepares Network Slice Instance (NSI) detail (block 2332), and forwards the information, in a request to create a NSI record, to inventory manager 2310 (signal 2334). In response, inventory manager 2310 creates and inserts an NSI record in its database (block 2336). NSMF 2304 notifies NBI 2302 that the requested slice has been created (signal 2338).

Figure 24C:
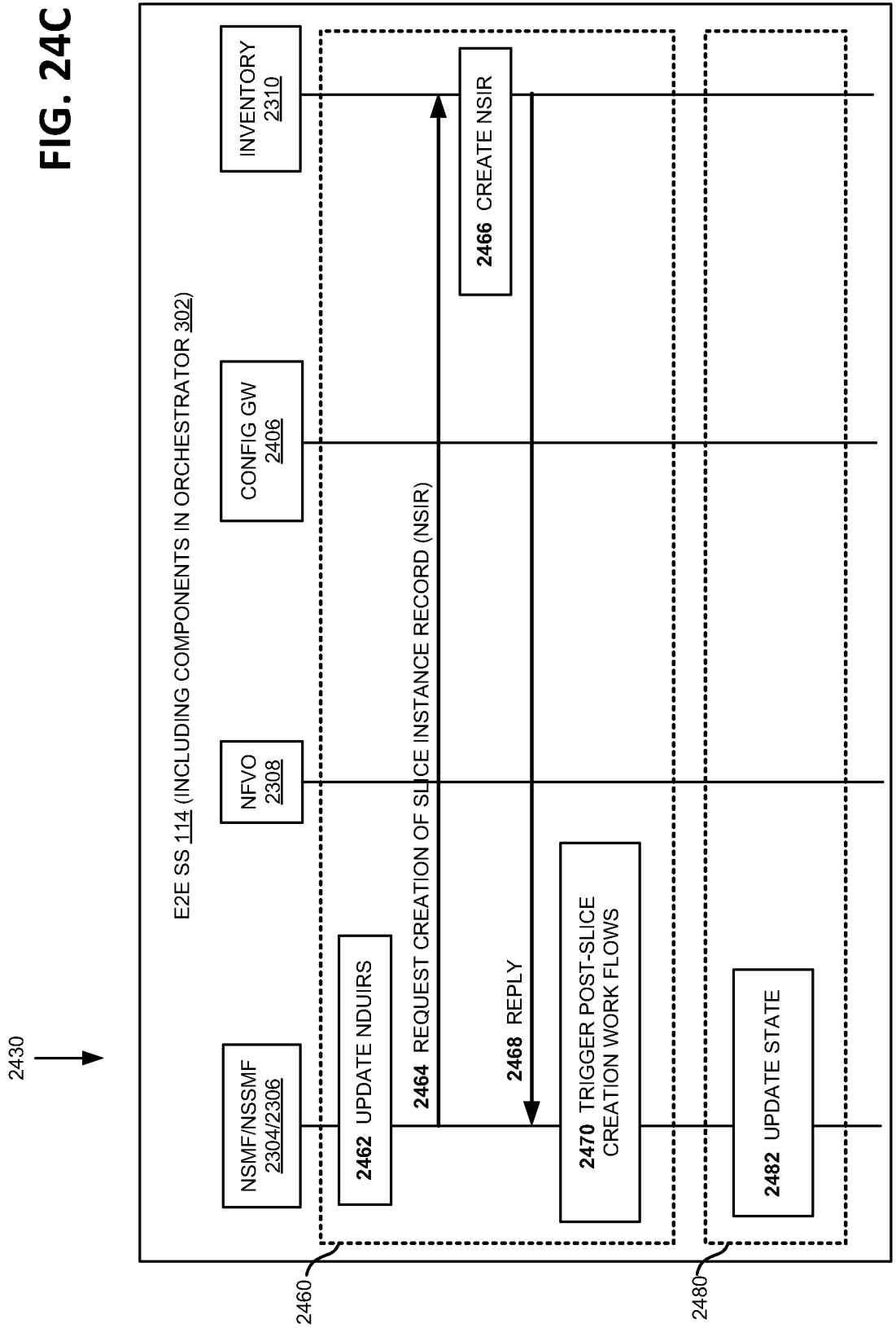

FIGS. 24A-24C are a signaling diagram that is associated with an exemplary slice deployment process 2400 according to another implementation. As shown in FIG. 24A, process 2400 may include a designer 504 (which represents the clients used by the members of the design team) may design an E2E Slice Service (E2E SS) for deployment (signal 2410). A slice design is performed at the E2E level, comprising all subnets and associated slice configurations. As discussed above, the design may include sub-designs of NFs, NSs, IDUs, NDUs, ADUs, SASs, service profiles, slice profiles, configurations, etc. With the completion of the design, design component 303 of E2E SS deployment system 114 may distribute the design to NSMF 2304 and NSSMF 2306 (signal 2412). NSMF/NSSMF 2304/2306 may, in turn, distribute the NFs to NFVO 2308 (signal 2414) and configuration components to configuration gateway 2406 (2416). In addition, NSMF/NSSMF 2304/2306 may store the design at inventory 2310 (2418).

With the design resident within the system, an operations team 2402 (the client side of the programs for managing deployment) may request deployment of the E2E SS (signal 242 to NSMF/NSSMF 2304/2306, via a North Bound Interface (NBI) of E2E deployment system 114. The request may include an NDU ID along with deployment parameters for each subnet in the design and each network deployment unit for the subnet. The information is required to trigger the deployment of each NDU for corresponding subnet (i.e., a slice for the subnet). Based on the design and the request payload, NSMF/NSSMF 2304/2306 may select and determine a flexible workflow procedure in place of the E2E slice deployment workflow described above with reference to FIG. 23 (block 2422). NSMF/NSSMF 2304/2306 may enter the flexible workflow procedure 2430 illustrated in FIGS. 24B and 24C.

As shown in FIG. 24B, flexible workflow procedure 2430 includes, for each of the requested slice for the corresponding subnet, NSMF/NSSMF 2304/2306 identifying the parent network slice of the NDU, using the NDU ID. The NDU ID is the ID of TOSCA based NSD of the NDU. NSMF 2304/NSSMF 2306 then unwraps the NDU design, identifying the network slice, network configuration components (NCs), slice configuration components (SCs), and location components (LOCs) for the NDU (box 2432). In addition, NSMF/NSSMF 2304/2306 may compare the NDU's slice metadata (SMD) to identify the overall service to be deployed (block 2434). Thereafter, NSMF/NSSMS 2304/2306 may forward a request to NFVO 2308, to deploy NSs at the identified locations (signal 2436). Sending the request to NFVO 2308 delegates the creation of NSs to NFVO 2308.

In response, NFVO 2308 creates NFs. Next, NFVO 2308 creates a network service record (NSR) (block 2438) and sends the NSR to NSMF/NSSMF 2304/2306 (signal 2340). Upon obtaining the NSR, NSMF/NSSMF 2304/2306 then sends a configuration request to provision the slice to configuration gateway 2406 (signal 2442). In response, configuration gateway 2406 applies slice configurations and other configurations (block 2444), and then, provides the configured states of the components to NSMF/NSSMF 2304/2306 (signal 2446). NSMF/NSSMF 2304/2306 then transmits a request to create a NDU information record (NDUIR) to inventory 2310 (signal 2448), which responds by creating the NDUIR (block 2450) and then sending a reply to NSMF/NSSMF 2304/2306 (signal 2452). Accordingly, NSMF 2304/NSSMF 2306 maintains the history of NDU deployment for the overall network slice.

After the receipt of the reply from inventory manager 2310 regarding the NDUIRs, workflow process 2430 may enter one of two branches 2460 or 2480 shown in FIG. 24C, depending on whether the NDU corresponding to the NDUIR is the last NDU in the requested slice deployment. If the NDU is the last one for the requested deployment, the workflow 2430 enters branch 2460. Otherwise, workflow 2430 enters branch 2480.

Processing branch 2460 includes updating the local copies of the NDUIRs at NSMF/NSSMF 2304/2306 to reflect the completion of the slice and its NDU deployment history for the slice. Furthermore, by combining the NDUIRs, NSMF 2304/2306 may generate a network slice instance record (NSIR). The NSIR may be sent to inventory manager 2310 (signal 2464), which responds by storing the NSIR (block 2466) and sending a reply to NSMF 2304/NSSMF 2306. Next, NSMF/NSSMF 2304/2306 triggers or initiates post-network slice creation workflows (e.g., sending additional notifications, updating other records, etc.). Processing branch 32480 includes updating and recording NDU states and SMD, at NSMF/NSSMF 2304/2306, to reflect that the slice is not complete. NSMF/NSSMF 2304/2306 may continue with its flexible workflow for deploying the slice.

In this specification, various preferred embodiments have been described with reference to the accompanying drawings. Modifications may be made thereto, and additional embodiments may be implemented, without departing from the broader scope of the invention as set forth in the claims that follow. The specification and drawings are accordingly to be regarded in an illustrative rather than restrictive sense.

While a series of processes have been described above with regard to signals and blocks various signal flow diagrams, the order of the processing and the signals may be modified in other implementations. In addition, non-dependent processing and signaling may be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store, or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A system comprising one or more devices that include processors, wherein the processors are configured to:
   receive instructions to assemble a slice service design for a network using slice design components;
   store the slice service design;
   receive a request to deploy a slice service specified by the slice service design; and
   perform one of:
      deploy the slice service in subnets of the network; or
      deploy services defined by portions of the slice service design in a particular number of subnets, among the subnets, of the network.

2. The system of claim 1, wherein the processors are further configured to:
   retrieve one or more descriptors, from a database, that correspond to the slice service design; and
   parse the descriptors to identify network deployment units to be deployed at the subnets,
   wherein when the processors deploy the slice service, the processors cause network functions to be instantiated in one or more of the subnets.

3. The system of claim 1, wherein the processors are further configured to:
   receive instructions to design the slice design components, wherein the slice design components include at least one of:
   a network function component, a network deployment unit, an infrastructure deployment unit, a service assurance service component, and an assurance deployment unit.

4. The system of claim 3, wherein the network functions include:
   an Access and Mobility Function (AMF);
   a Session Management Function (SMF);
   a central unit-control plane (CU-CP); or
   a distributed unit (DU).

5. The system of claim 3, wherein the infrastructure deployment unit includes:
   a network service component and a location component.

6. The system of claim 3, wherein the assurance deployment unit includes: an assurance module that comprises:
   an assurance input component, an assurance output component, and an assurance module configuration component.

7. The system of claim 1, wherein when the processors deploy the slice service, the processors are configured to:
   apply configuration parameters specified by configuration components defined in the slice service design.

8. The system of claim 1, wherein when the processors deploy the slice service, the processors are configured to:
   create network deployment unit instance records (NDUIRs), and
   create, for each of the subnets, a network slice instance record (NSIR).

9. The system of claim 1, wherein the processors are further configured to:
   complete the slice service design,
   wherein completing the slice service design includes distributing components of the slice service design to a network entity for virtualizing network functions.

10. The system of claim 1, wherein the stored service design includes:
    a service profile that comprises a slice profile and first attribute components, and wherein the slice profile includes an end-to-end service slice (E2E SS) component and a second attribute components, wherein the first and second attribute components specify key-value pairs.

11. A method comprising:
    assembling a slice service design for a network;
    storing the slice service design;
    receiving a request to deploy a slice service specified by the slice service design; and
    performing one of:
       deploying the slice service in subnets of the network; or
       deploying services defined by portions of the slice service design in a particular number of subnets, among the subnets, of the network.

12. The method of claim 11, further comprising:
    retrieving one or more descriptors, from a database, that correspond to the slice service design; and
    parsing the descriptors to identify network deployment units to be deployed in the subnets,
    wherein deploying the slice service comprises instantiating network functions in one or more of the subnets.

13. The method of claim 11, further comprising:
    receiving instructions to design the slice design components, wherein the slice design components include at least one of:
    a network function component, a network deployment unit, an infrastructure deployment unit, a service assurance service component, and an assurance deployment unit.

14. The method of claim 13, wherein the network functions include:
    an Access and Mobility Function (AMF);
    a Session Management Function (SMF);
    a central unit-control plane (CU-CP); or
    a distributed unit (DU).

15. The method of claim 13, wherein the infrastructure deployment unit includes:
    a network service component and a location component.

16. The method of claim 13, wherein the assurance deployment unit includes an assurance module that comprises:
    an assurance input component, an assurance output component, and an assurance module configuration component, and a microservice component for performing analytics on key performance indicators (KPIs).

17. The method of claim 11, wherein deploying the slice service includes:
    applying configuration parameters specified by configuration components defined in the service sign.

18. The method of claim 11, wherein deploying the slice service includes:
    creating network deployment unit instance records (NDUIRs), and
    creating, for each of the subnets, a network slice instance record (NSIR).

19. A non-transitory computer-readable medium comprising processor executable instructions, that when executed by one or more processors, cause the processors to:
- receive instructions to assemble a slice service design for a network using slice design components;
- store the slice service design;
- receive a request to deploy a slice service specified by the slice service design; and
- perform one of:
  - deploy the slice service in subnets of the network; or
  - deploy services defined by portions of the slice service design in a particular number of subnets, among the subnets, of the network.

20. The non-transitory computer-readable medium of claim 19, further comprising processor-executable instructions for causing, when executed by the processors, the processors to:
- retrieve one or more descriptors, from a database, that correspond to the slice design; and
- parse the descriptors to identify network deployment units to be deployed in the subnets,
- wherein when the processors deploy the slice service, the processors cause network functions to be instantiated in one or more of the subnets.

* * * * *